United States Patent
Kato et al.

(10) Patent No.: US 9,333,970 B2
(45) Date of Patent: May 10, 2016

(54) TRACTION CONTROL DEVICE AND TRACTION CONTROL METHOD

(71) Applicant: PIONEER CORPORATION, Kanagawa (JP)

(72) Inventors: Masahiro Kato, Kanagawa (JP); Dejun Yin, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/401,940

(22) PCT Filed: May 20, 2013

(86) PCT No.: PCT/JP2013/063939
§ 371 (c)(1),
(2) Date: Nov. 18, 2014

(87) PCT Pub. No.: WO2013/176081
PCT Pub. Date: Nov. 28, 2013

(65) Prior Publication Data
US 2015/0112508 A1   Apr. 23, 2015

(30) Foreign Application Priority Data

May 21, 2012   (JP) .................................. 2012-115490

(51) Int. Cl.
*B60T 7/00*   (2006.01)
*B60W 30/00*   (2006.01)
(Continued)

(52) U.S. Cl.
CPC ............... *B60W 30/00* (2013.01); *B60K 28/16* (2013.01); *B60L 3/106* (2013.01); *B60L 15/20* (2013.01);
(Continued)

(58) Field of Classification Search
CPC .... B60W 30/00; B60L 3/106; B60L 11/1805; B60L 15/20; B60L 2240/423; B60L 2240/463; B60L 2240/465; B60L 2240/461; Y02T 10/642; Y02T 10/7005; Y02T 10/7275; B60K 28/16
See application file for complete search history.

(56) References Cited

U.S. PATENT DOCUMENTS 4,985,837 A * 1/1991 Togai ..................... B60K 28/16
                                                          180/197
5,765,657 A * 6/1998 Fukumura ............... B60K 28/16
                                                          180/197
(Continued)

FOREIGN PATENT DOCUMENTS

JP         08-182119        7/1996
JP         2000-217209      8/2000
(Continued)

OTHER PUBLICATIONS

International Search Report, PCT/JP2013/063939, Jul. 2, 2013.
(Continued)

*Primary Examiner* — Mary Cheung
(74) *Attorney, Agent, or Firm* — Young & Thompson

(57) ABSTRACT

A parameter calculation part calculates an adaptive gain coefficient 'k' for the road surface conditions, based on frictional coefficient μ and a slip ratio λ from an acquisition part and a coefficient 'b' in a storage part. Subsequently, the parameter calculation part calculates an adaptive time constant τ by which the stability of traction control can be ensured, based on the gain coefficient 'k' and a coefficient 'a' within the storage part. Along with the calculated gain coefficient 'k' being set in a gain multiplication part, the calculated time constant τ is set in a filter part. According to these settings, model following control is executed by taking, as a reference model, an adhesion model in which the driving wheel does not slip. This enhances slip prevention performance while ensuring control stability, making stable travel possible while ensuring the required drive force in accordance with road surface state.

11 Claims, 15 Drawing Sheets

(51) Int. Cl.
*B60L 15/20* (2006.01)
*B60L 3/10* (2006.01)
*B60K 28/16* (2006.01)

(52) U.S. Cl.
CPC ...... *B60L 2240/423* (2013.01); *B60L 2240/461* (2013.01); *B60L 2240/463* (2013.01); *B60L 2240/465* (2013.01); *B60L 2260/42* (2013.01); *B60L 2260/44* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| 6,598,946 B2 * | 7/2003 | Nagae | B60K 23/0808 180/249 |
| 2009/0210128 A1 | 8/2009 | Fujimoto et al. | |
| 2011/0060487 A1 * | 3/2011 | Jess | B60K 28/165 701/22 |

FOREIGN PATENT DOCUMENTS

| JP | 2008-099346 | 4/2008 |
| JP | 2010-051160 | 3/2010 |
| WO | WO 2008/029524 | 3/2008 |

OTHER PUBLICATIONS

Extended European Search Report—EP 13 79 4750—Jan. 26, 2016.

A.Visioli et al: "Disturbance Observer-based Control" In: "Control of Integral Processes with Dead Time", Jan. 1, 2011, Springer, London, XP055238843, pp. 195-197, D0I: 10.1007/978-0-85729-070-0_10, *pp. 195-197; figure 10.1a *.

Kichul Hong et al: "A Load Torque Compensation Scheme Under the Speed Measurement Delay", IEEE Transactions on Industrial Electronics, IEEE Service Center, Piscataway, NJ, USA, vol. 45, No. 2, Apr. 1, 1998, XP011023357, ISSN: 0278-0046 * Sections III, IV; figures 2, 3.

Sado H et al: "Road condition estimation for traction control in electric vehicle", Industrial Electronics, 1999. ISIE '99. Proceedings of the IEEE International Symposium on Bled, Slovenia Jul. 12-16, 1999, Piscataway, NJ, USA, IEEE, US, vol. 2, Jul. 12, 1999, pp. 973-978, XP010353980, D01: 10.1109/ISIE.1999.798747 ISBN: 978-0/7803-5662-7 *abstract; figures 1, 8 * *Sections I, III *.

* cited by examiner

Fig.8
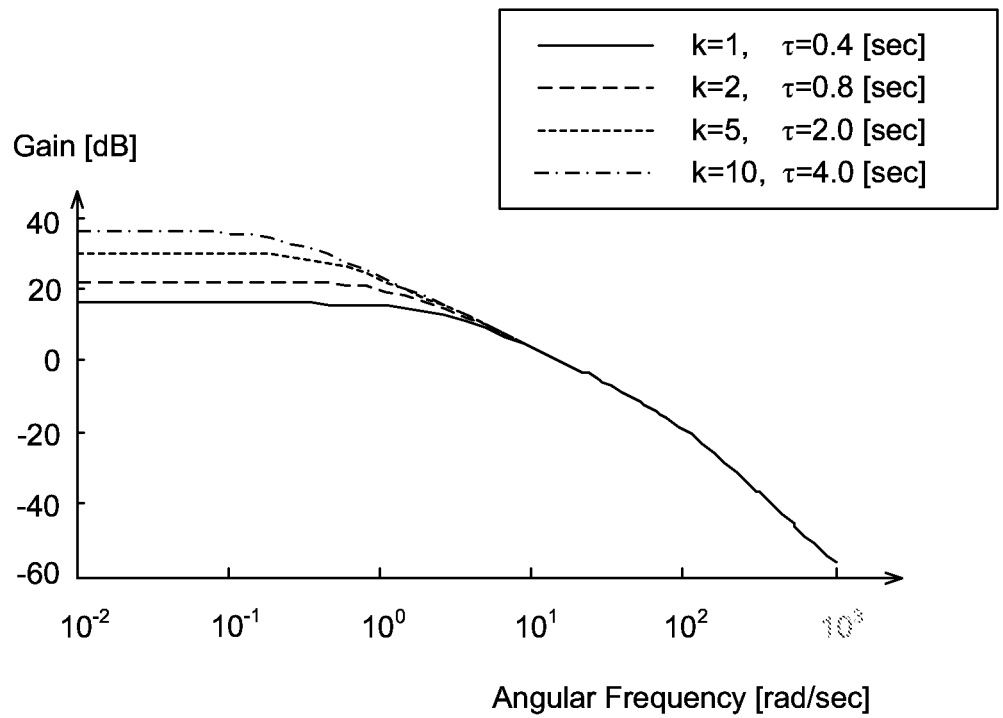
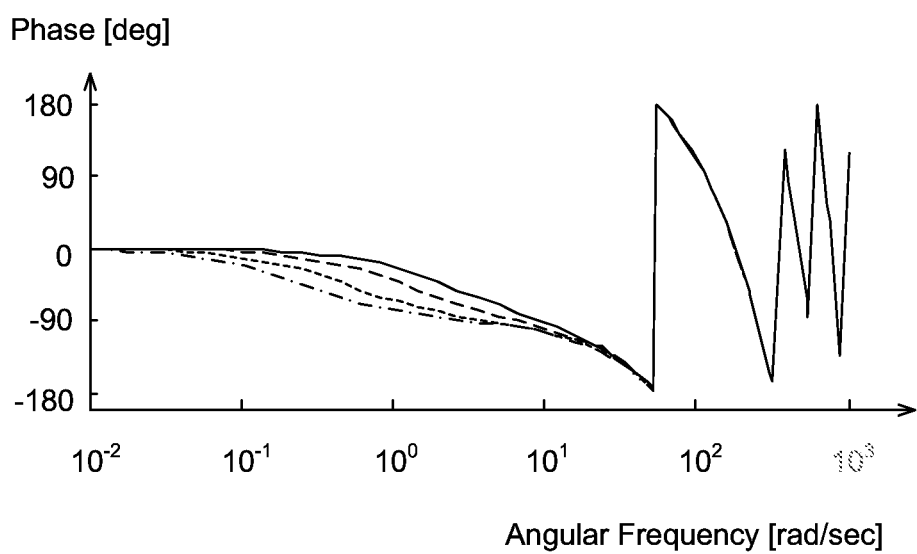

Fig.10
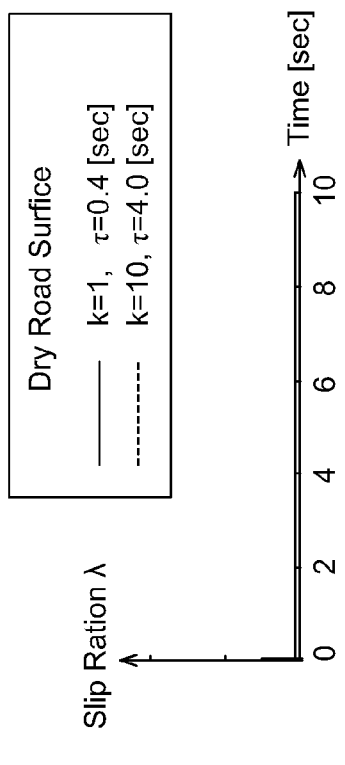 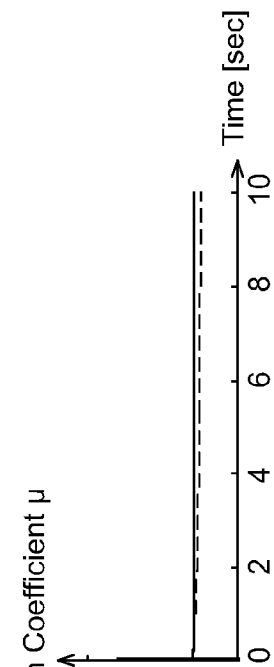 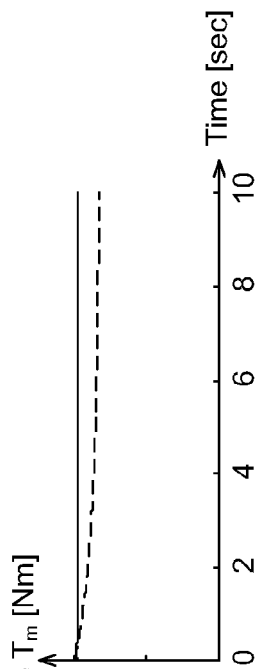
(B) Dry Road Surface
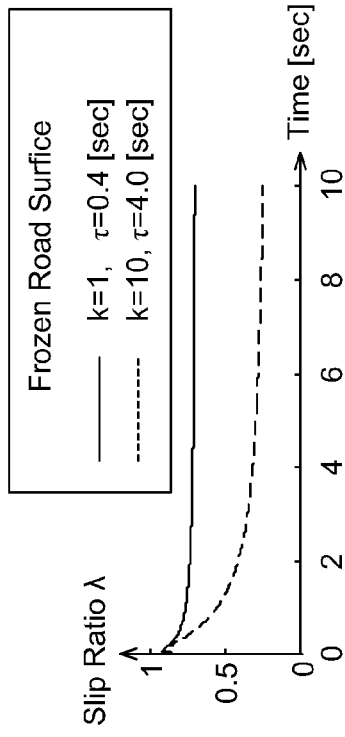 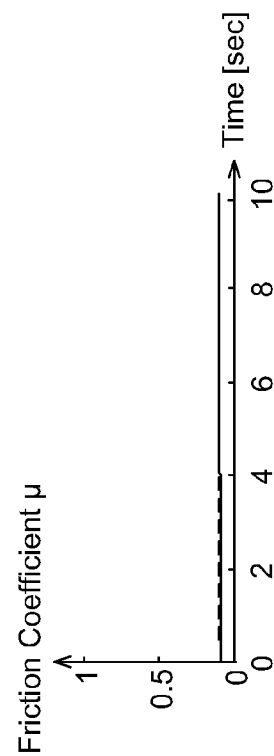 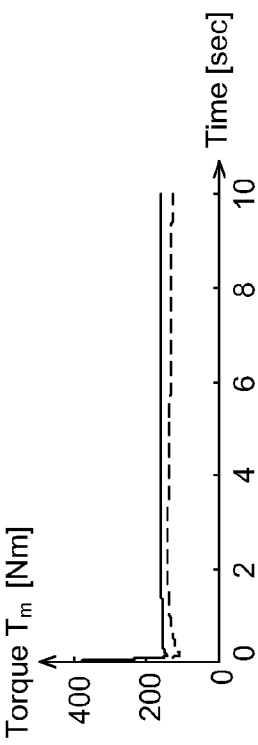
(A) Frozen Road Surface Fig.12
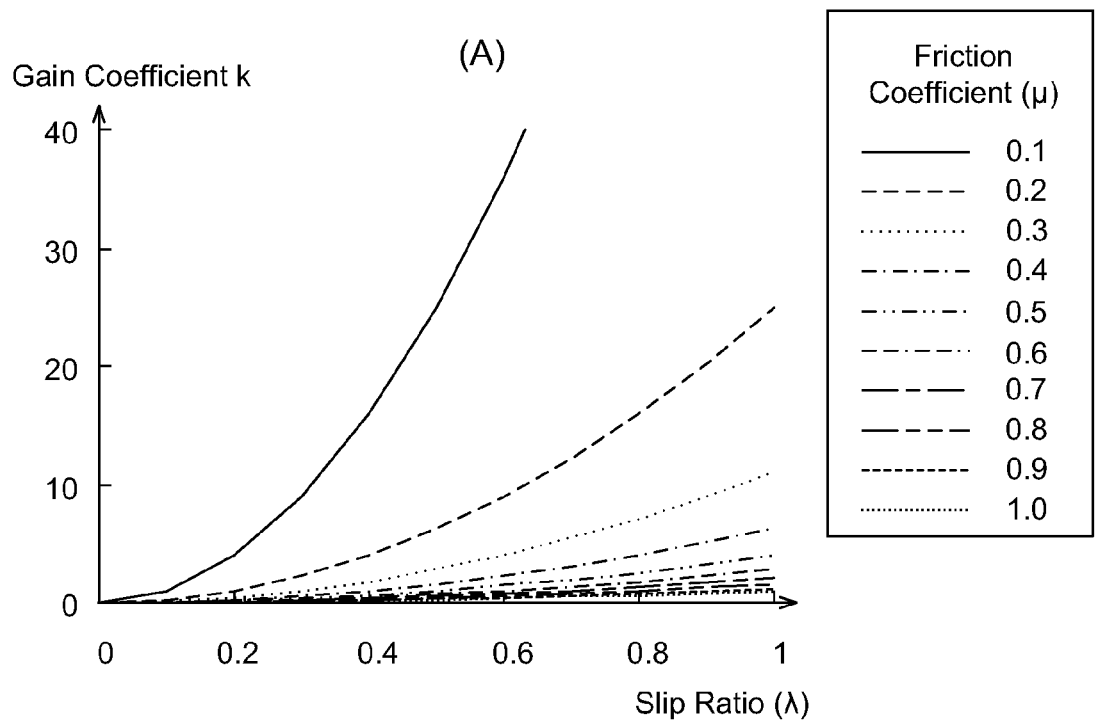
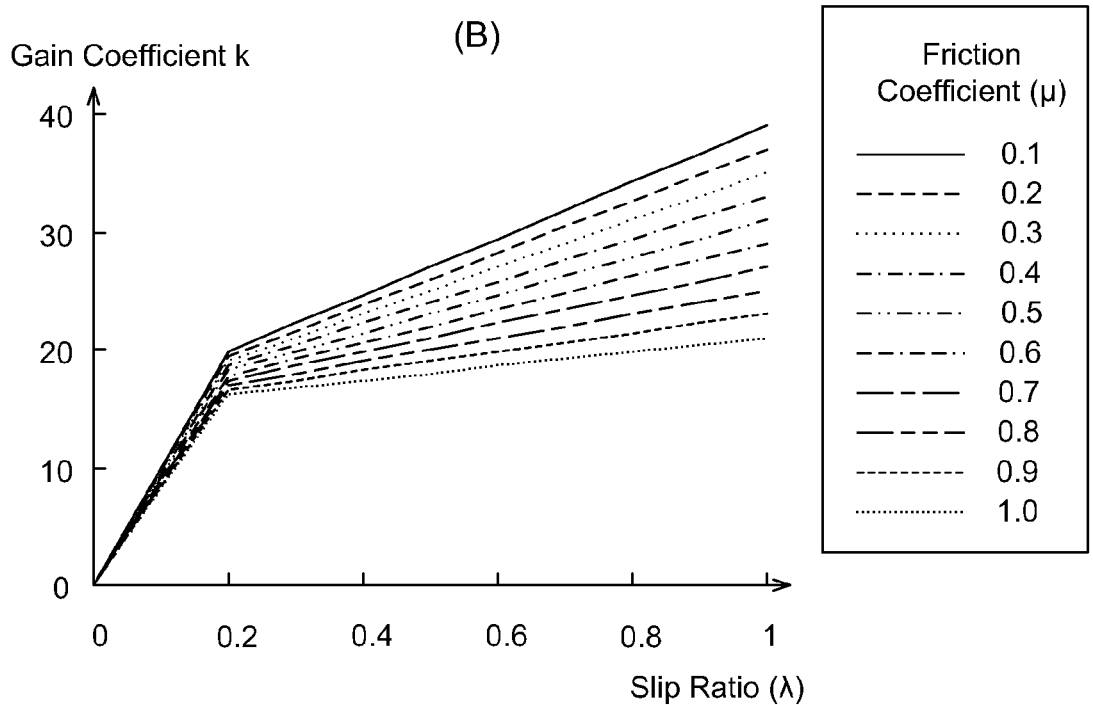

Fig.17
Non-Slippery Road Surface
Wheel Speeds $r_j \cdot \omega_j$ [m/s]
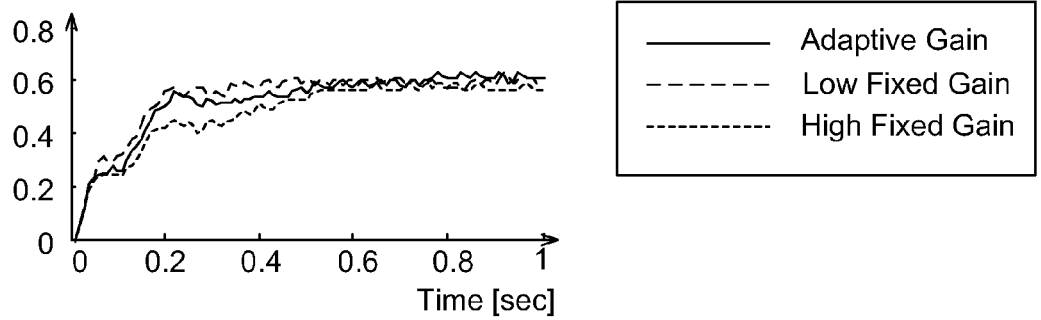
— Adaptive Gain
- - - - Low Fixed Gain
- - - - High Fixed Gain
Vehicle Body Speed $v$ [m/s]
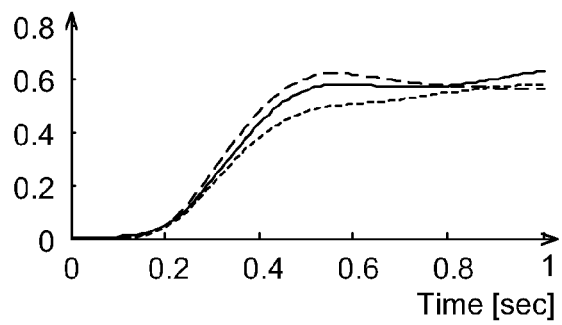
Slip Ratios $\lambda_j$
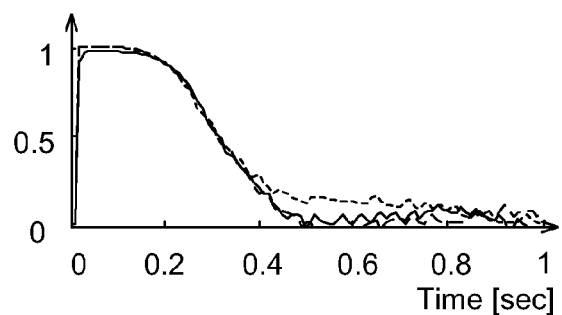
Friction Coefficients $\mu_j$
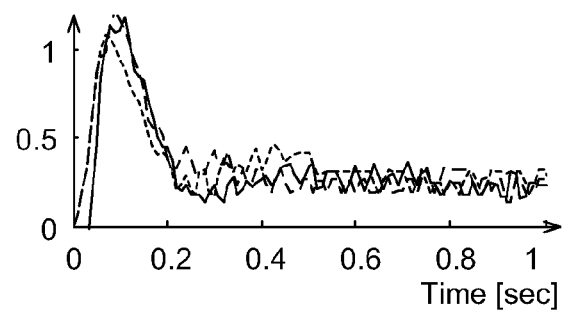

TRACTION CONTROL DEVICE AND TRACTION CONTROL METHOD

TECHNICAL FIELD

The present invention relates to a traction control device, to a traction control method and to a traction control program, and to a recording medium upon which that traction control program is recorded.

BACKGROUND ART

From the past, various types of technique related to traction control have been proposed, in order to prevent the tires of a moving body such as a four wheeled vehicle that has driving wheels or the like from going into the freely spinning rotational state. As one such proposed technique, a technique has been proposed that controls the torque so as to prevent increase of the slip ratio during traveling by employing a technique of model following control (refer to Patent Document #1 (and in particular to FIG. 12 thereof and the description related thereto), hereinafter termed the "prior art example").

With this technique of the prior art example, a vehicle model of a state in which perfect adhesion is present between the driving wheel and the road surface, in other words of a state in which no slip at all is occurring, is virtually created as a reference model within a control program. And control is performed in order to make the driving wheel of the actual vehicle follow the reference model (hereinafter this will be termed "model following control").

In concrete terms, with the technique of the prior art example, from the result of detection of the rotational speed of the driving wheel of the actual vehicle, a differential torque is calculated, which is the difference between a torque inversely calculated according to the above reference model and the torque that caused the above detected rotational speed to be generated. And, after applying a first-order delay to this calculated differential by passing it through a low pass filter, negative feedback control is performed by taking, as a correction amount, this value multiplied by a predetermined gain coefficient which is a positive value. The result is that the torque upon the driving wheel is reduced, so that increase of the slip ratio is suppressed. The reasons for suppressing increase of the slip ratio by this type of negative feedback control are as follows.

When the tire spins freely, the inertia becomes light, thereby only the driving wheel is rotating. However, when the driving wheel adheres to the road surface, the inertia becomes heavy, thereby not only the driving wheel but also the vehicle body is being driven. In other words, when the slip ratio increases, the rotational speed of the driving wheel rises.

Accordingly, in the case that slip ratio is greater than zero, inverse calculation using the rotational speed of the driving wheel with the inertia of the adhesion state gives a higher torque value than the torque that is actually applied to the driving wheel. Due to this, a differential torque value which is positive is obtained by subtracting the torque actually applied to the driving wheel from the torque obtained by the above inverse calculation. The correction amount as the result obtained by multiplying that differential torque value by a predetermined gain coefficient, a positive value as described above, becomes a positive value. Therefore, negative feedback control by using the correction amount reduces the torque applied to the driving wheel, and thus to decrease the slip ratio.

Note that, in the prior art example, it is commented that it is necessary to adjust the gain coefficient in order to take so-called dead time into consideration.

PRIOR ART DOCUMENTS

Patent Documents

Patent Document #1: WO 2008/029524

SUMMARY OF THE INVENTION

Problems to be Solved by the Invention

With an actual vehicle system, it is necessary to take into account a certain delay time when transmitting the torque command value from the torque control part to the motor that drives the driving wheel, the torque response characteristic of the motor, a delay time for transmission of the drive force of the motor to the driving wheel, and so on. Thus, in model following control, the delay time that appears in the example previously described must be treated as a so-called dead time.

Note that if, for example, the communication is performed by employing the CAN (Controller Area Network) protocol, transmission of the torque command value from the torque control part to the motor is delayed corresponding to the CAN communication cycle during the transmission.

The dead time and the torque response characteristic of the motor influenced upon the stability and the control performance of the model following control system. Due to this, in order to provide a control system that satisfies the stability and control performance, the motor response characteristic must be taken into consideration together with the dead time in the prior art example previously described.

Moreover, the relationship between the slip ratio of the driving wheel and the friction coefficient of that against the road surface varies greatly depending on the surface condition of the road, such as dry, wet, frozen, or the like. This is equivalent to a large disturbance change being inputted to the control system. Due to this, there is a demand upon the model following control system to perform traction control conform to the disturbance form great alteration of the road surface condition.

For example, during travel upon a frozen road, it required to suppress free spinning of the driving wheel immediately. Moreover, during travel upon a dry road, it is required to both satisfy for suppressing the free spinning of the driving wheel and ensuring sufficient drive force, when acceleration, climbing a slope, high-speed traveling, or the like, is required.

The present invention has been conceived under the circumstances described above. Its object is to provide a traction control device and a traction control method for enabling to realize the stable traveling while ensuring the necessary drive force depending on the road surface condition, along with enhancing the slip suppression performance while maintaining control stability.

Means for Solving the Problems

The invention of claim 1 is a traction control device that performs traction control for a moving body having a driving wheel which is driven by a motor, comprising: an acquisition part configured to acquire a torque instruction value for said driving wheel, the rotational speed of said driving wheel, and friction coefficient information for the road surface upon which said driving wheel runs; a torque command value calculation part configured to calculate the torque command value to be outputted to the motor for driving said driving wheel, on the basis of said acquired torque instruction value and a correction amount; an estimated torque value calculation part configured to calculate an estimated value of torque operating upon said driving wheel, on the basis of said calculated torque command value and a model for torque transmission to said driving wheel; an inverse torque value calculation part configured to calculate a torque value corresponding to said acquired rotational speed, according to a reference model in which no slip of said driving wheel takes place; a filter part configured to apply a first-order delay to the difference between the result of calculation by said estimated torque value calculation part and the result of calculation by said inverse torque value calculation part; and a gain multiplication part configured to feed back, to said torque command value calculation part, as said correction amount, the result obtained by multiplying said difference to which said first-order delay has been applied by a gain coefficient; wherein said gain coefficient takes a value which is adaptively set by using said acquired friction coefficient information; and the time constant of said filter part takes a value which is adaptively set by utilizing said acquired friction coefficient information, or a value which is determined on the basis of the estimated value of the maximum value taken by said gain coefficient.

And the invention of claim 7 is a traction control device that performs traction control for a moving body having a driving wheel which is driven by a motor, comprising: an acquisition part configured to acquire a torque instruction value for said driving wheel, the rotational speed of said driving wheel, and an actual torque value that drives said motor; a torque command value calculation part configured to calculate the torque command value to be outputted to the motor for driving said driving wheel, on the basis of said acquired torque instruction value and a correction amount; a filter part configured to apply a first-order delay to a value calculated on the basis of said calculated torque command value and said acquired rotational speed; and a gain multiplication part configured to feed back to said torque command value calculation part, as said correction amount, the result obtained by multiplying the value to which said first-order delay has been applied by a gain coefficient; and wherein said gain coefficient takes a value which is adaptively set on the basis of said acquired rotational speed and said acquired actual torque value; and the time constant of said filter part takes a value which is adaptively set on the basis of said acquired rotational speed and said acquired actual torque value, or a value which is determined on the basis of the estimated value of the maximum value taken by said gain coefficient.

Furthermore, the invention of claim 8 is a traction control method that performs traction control for a moving body having a driving wheel which is driven by a motor, comprising the steps of: an acquisition step of acquiring a torque instruction value for said driving wheel, the rotational speed of said driving wheel, and friction coefficient information for the road surface upon which said driving wheel runs; a torque command value calculation step of, on the basis of said acquired torque instruction value and a correction amount at the present time point, calculating a torque command value to be outputted to the motor for driving said driving wheel; an estimated torque value calculation step of, on the basis of said calculated torque command value and a model for torque transmission to said driving wheel, calculating an estimated value of torque operating upon said driving wheel; an inverse torque value calculation step of calculating a torque value corresponding to said acquired rotational speed, according to a reference model in which no slip of said driving wheel takes place; a first-order delay application process of applying a first-order delay to the difference between the result of calculation in said estimated torque value calculation step and the result of calculation in said inverse torque value calculation step with a time constant which has either a value which is adaptively set by utilizing said acquired friction coefficient information, or a value which is determined on the basis of the estimated value of the maximum value taken by said gain coefficient which is adaptively set by utilizing said acquired friction coefficient information; and a correction amount updating step of taking the result obtained by multiplying said difference to which said first-order delay has been applied by said gain coefficient, as a new correction amount; and wherein said acquisition step, said torque command value calculation step of taking said new correction amount as the correction amount at said present time point, said estimated torque value calculation step, said inverse torque value calculation step, said first-order delay application step, and said correction amount updating step are repeated.

The invention of claim 9 is a traction control program, wherein it causes a calculation part to execute a traction control method of claim 8.

Moreover, the invention of claim 10 is a recording medium, wherein the traction control program of claim 9 is readably recorded thereupon by the calculation part.

BRIEF DESCRIPTION OF THE DRAWINGS

FIG. 8 is the second figure showing Bode diagrams for the open loop transfer function of the model following control system of FIG. 1;

FIG. 10 is the figure showing simulation results for the frozen road or the dry road, when the gain coefficient 'k' and the time constant τ in the model following control system of FIG. 1 are set to a certain values;

FIG. 12 is the figure for explanation of a modified embodiment, wherein the gain coefficient 'k' is determined on the basis of the slip ratio λ and the friction coefficient μ;

FIG. 17 is the second figure showing experimental results for the model of the device of FIG. 13.

REFERENCE SIGNS LIST

Figure 1:
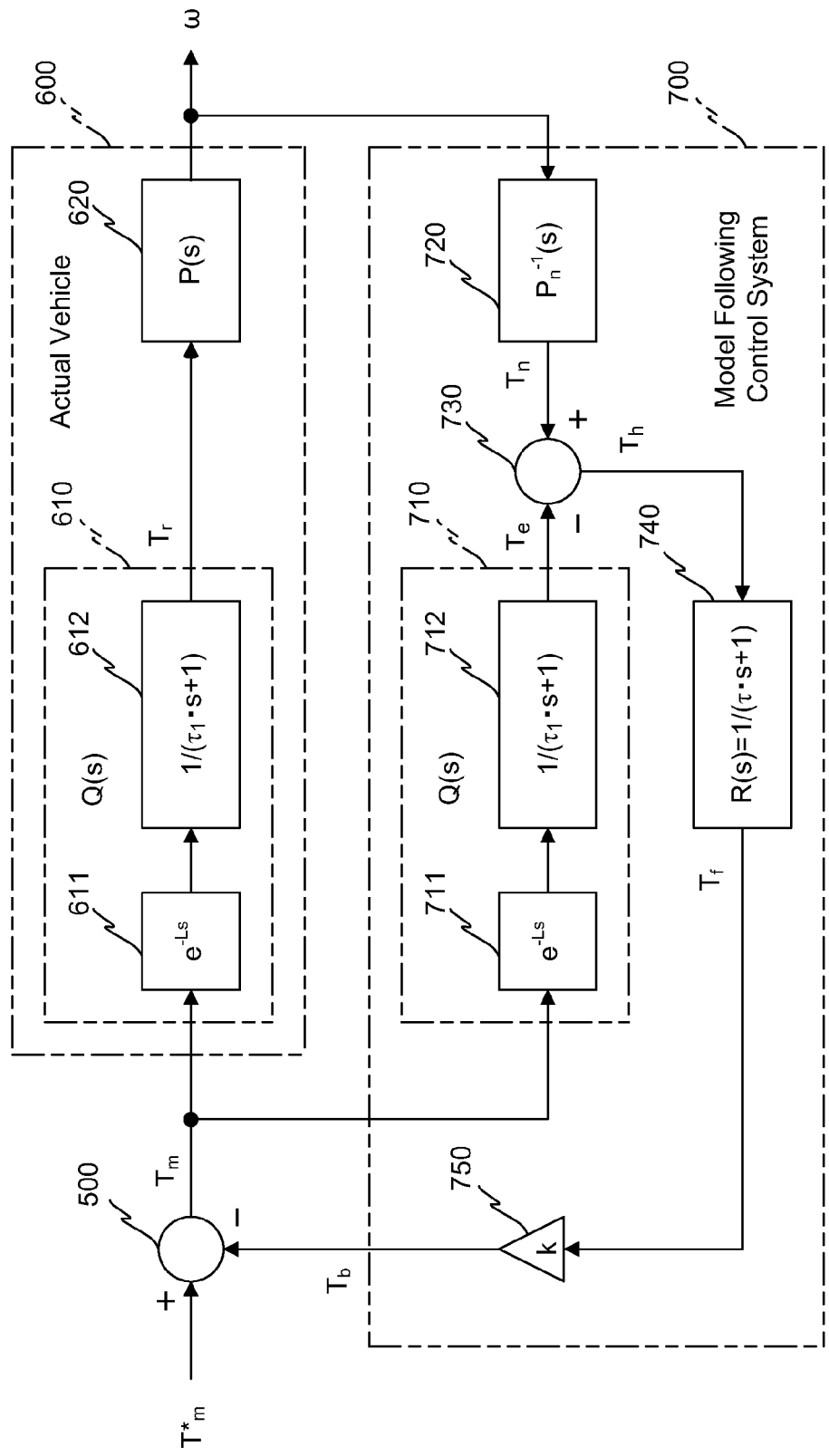
FIG. 1 is a block diagram of a model following control system employed in an embodiment of the present invention.

100: the traction control device
110: the control unit (including an acquisition part, a torque command value calculation part, an estimated torque value calculation part, an inverse torque value calculation part, a filter part, and a gain multiplication part)
300: the traction control device
310: the acquisition part
320: the torque command value calculation part
330: the estimated torque value calculation part
340: the inverse torque value calculation part
360: the filter part
370: the gain multiplication part

EMBODIMENTS FOR CARRYING OUT THE INVENTION

In the following, an embodiment of the present invention is explained with reference to FIGS. 1 through 11. Note that the same reference symbols are appended to elements that are the same or equivalent, and duplicated explanation will be omitted in the following explanation and in the drawings.

[Configuration of the Traction Control System]

First, the configuration of a traction control system for a driving wheel for which a traction control device according to the embodiment is implemented is explained. Note that the driving wheel is driven by an electric motor in this embodiment.

FIG. 1 is the block diagram showing the traction control system including the model following control system 700 employed in the embodiment. As shown in FIG. 1, it is arranged for the model following control system 700 to perform traction control for an actual vehicle 600, namely, to perform slip ratio reduction control, in cooperation with a subtraction block 500.

Note that the system is expressed by a model using the actual vehicle model, wherein the torque transmission block 610 (transfer function: Q(s)) and the driving wheel response block 620 (transfer function: P(s)) are connected in series, until the output of a rotational speed ω of the driving wheel of the actual vehicle 600, wherein ω is corresponding to the torque command value $T_m$ sent from the subtraction block 500. Note that "s" is a Laplacian operator.

The torque transmission block 610 is the block based upon the torque transfer model until the torque command value $T_m$ outputted from the subtraction block 500 is provided to the driving wheel as an actual torque value $T_r$. The torque transmission block 610 is expressed as the series connection of a dead time block 611 (transfer function: $e^{-Ls}$) and a motor torque response block 612 (the transfer function: $1/(\tau_1 \cdot s+1)$).

The dead time block 611 is the block to expresses that a total time L can be treated as an overall dead time L in model following control; wherein L is the sum of delay times of various types, such as a delay time for transmission of the torque command value $T_m$ from the subtraction block 500 to the motor, a delay time for transmission of the drive force generated by the motor to the driving wheel, and so on. Note that the dead time L may be actually previously measured by the experiment, or may be previously calculated by the simulation.

The motor torque response block 612 is the block to expresses that the torque response characteristic of the motor, to which the torque command value $T_m$ has been transmitted, is approximated by a first-order delay model (time constant: $\tau_1$). The torque response characteristic of the motor is expressed by a first-order delay model, due to the knowledge that "the motor torque response characteristic is approximated by a first-order delay model with the necessary accuracy during traction control", which is obtained from the results for the present invention by the inventors. Note that the time constant $\tau_1$ may be surveyed in advance by the experiment, or may be calculated in advance by the simulation.

As described above, the transfer function Q(s) of the torque transmission block 610 is expressed as the series connection of the dead time block 611 and the motor torque response block 612 is given by the following Equation (1):

$$Q(s)=e^{-Ls}/(\tau_1 \cdot s+1) \qquad (1)$$

The driving wheel response block 620 (the transfer function: P(s)) is the block that appears when the rotational speed of the driving wheel is considered as a response of the actual vehicle to the applied torque. The transfer function P(s) of the driving wheel response block 620 is described hereinafter.

The subtraction block 500 receives a torque instruction value $T^*_m$ sent from a torque instruction value generation part not shown in FIG. 1, and a correction amount $T_b$ sent from the model following control system 700. Then, the subtraction block 500 calculates the torque command value $T_m$ according to Equation (2) below. The torque command value $T_m$ thus calculated is sent to the motor of the actual vehicle, and also is sent to the model following control system 700.

$$T_m = T^*_m - T_b \qquad (2)$$

The model following control system 700 receives the torque command value $T_m$ from the subtraction block 500 and the rotational speed ω of the driving wheel. Then, the model following control system 700 calculates the correction amount $T_b$ on the basis of the torque command value $T_m$ and the rotational speed ω.

The model following system having the functions comprises a torque transmission block 710 (the transfer function: Q(s)), an adhesion model block 720 (the transfer function: $P_n^{-1}(s)$), and a subtraction block 730. Moreover, the model following control system 700 comprises a first-order delay block 740 (the transfer function: $R(s)=1/(\tau \cdot s+1)$), and a gain multiplication block 750 (the gain coefficient: k).

The torque transmission block 710 receives the torque command value $T_m$ from the subtraction block 500. On the basis of the torque command value $T_m$, the torque transmission block 710 estimates the actual torque value $T_r$ applied to the driving wheel, and assumes the result of the estimation as the estimated torque value $T_e$. The torque transmission block having the function comprises a dead time block 711 (the transfer function: $e^{-Ls}$) and a motor torque response block 712 (the transfer function: $1/(\tau_1 \cdot s+1)$).

The dead time block 711 is the block provided for corresponding to the dead time block 611. The dead time block 711 receives the torque command value $T_m$ sent from the subtraction block 500. Then, the dead time block 711 performs processing upon the torque command value $T_m$ corresponding to the dead time L. Note that, a value, which is surveyed or obtained by the simulation, may be employed as the dead time L as mentioned above.

The motor torque response block 712 is the block corresponding to the motor torque response block 612. The motor torque response block 712 receives the result of dead time processing sent from the dead time block 711. Then, the motor torque response block 712 performs the first-order delay processing with the time constant $\tau_1$ upon the result of the dead time processing to estimate the estimated torque value $T_e$. Note that a value, which is surveyed or obtained by the simulation, may be employed as the time constant $\tau_1$ as mentioned above.

The estimated torque value $T_e$ is calculated from the torque command value $T_m$ by the torque transmission block 710 having the configuration according to the following Equation (3):

$$T_e = Q(s) \cdot T_m \quad (3)$$

The adhesion model block 720 receives the rotational speed $\omega$. According to an adhesion model, a virtual model, in which no slip of the driving wheel occurs, the adhesion model block 720 calculates a torque value $T_n$ that corresponds to the rotational speed $\omega$ according to the following Equation (4):

$$T_n = P_n^{-1}(s) \cdot \omega \quad (4)$$

Note that the torque value $T_n$ is calculated backwards from the rotational speed $\omega$ by using the above adhesion model so that the torque value $T_n$ is also sometimes termed the "inverse torque value $T_n$" in below.

As described above, if the slip ratio is greater than zero, the inverse torque value $T_n$ has a value greater than that of the estimated torque value $T_e$. Note that the transfer function $P_n^{-1}(s)$ is described hereinafter.

The subtraction block 730 receives the estimated torque value $T_e$ sent from the torque transmission block 710 and the inverse torque value $T_n$ sent from the adhesion model block 720. Then, the subtraction block 730 calculates a differential torque value $T_h$ according to the following Equation (5):

$$T_h = T_n - T_e \quad (5)$$

The first-order delay block 740 receives the differential torque value $T_h$ sent from the subtraction block 730. Then, the first-order delay block 740 performs the first-order delay processing with time constant $\tau$ upon the differential torque value $T_h$, thus calculating a torque value $T_f$ according to the following Equation (6):

$$T_f = R(s) \cdot T_h = T_h / (\tau \cdot s + 1) \quad (6)$$

Note that the first-order delay processing is a low pass filter so that the torque value $T_f$ is also sometimes termed the "torque value $T_f$ after filtering" in below.

The gain multiplication block 750 (the gain coefficient: k) receives the torque value $T_f$ after filtering sent from the first-order delay block 740. Then, the gain multiplication block 750 calculates the correction amount $T_b$ according to the following Equation (7), and sends the calculated correction amount $T_b$ to the subtraction block 500.

$$T_b = k \cdot T_f \quad (7)$$

<The Transfer Functions P(s) and $P_n^{-1}(s)$>

Next, the transfer function P(s) of the driving wheel response block 620 and the transfer function $P_n^{-1}(s)$ of the adhesion model block 720 are explained.

Figure 2:
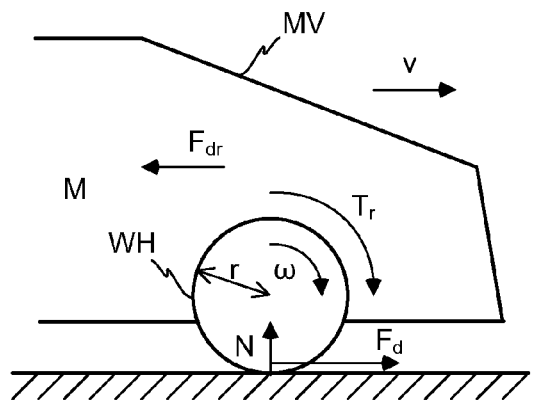
FIG. 2 is a figure showing variables in a driving wheel model.

The variables in a single wheel model of a driving wheel WH that is provided to a moving body MV are shown in FIG. 2 (hereinafter, it is sometimes also termed the "driving wheel model"). In FIG. 2, "M" is the weight of the moving body, "$F_d$" is the drive force of the driving wheel WH, and "$F_{dr}$" is the traveling resistance. Moreover, "$T_r$" is the actual torque value applied to the driving wheel WH, "v" is the speed of the moving body MV (in other words, the translational speed of the driving wheel WH), and "$\omega$" is the rotational speed of the driving wheel WH. Furthermore, "N" is the normal force operating upon the driving wheel WH, and "r" is the radius of the driving wheel WH.

With the driving wheel model shown in FIG. 2, the motion equation of the moving body MV is given by the following Equation (8):

$$M \cdot (dv/dt) = F_d - F_{dr} \quad (8)$$

Moreover, with the moment of inertia of the driving wheel WH being termed "$J_w$", the equation of motion of the driving wheel WH is given by the following Equation (9):

$$J_w \cdot (d\omega/dt) = T_r - r \cdot F_d \quad (9)$$

And, with the friction coefficient of the road surface with respect to the driving wheel WH being termed $\mu$, the relationship between the drive force $F_d$ and the normal force N is given by the following Equation (10):

$$\mu = F_d / N \quad (10)$$

Here, for example, the normal force N may be acquired rapidly and accurately by providing a load sensor that detects the load imposed upon the driving wheel WH. Moreover, on the basis of the actual torque value $T_r$ and the rotational speed $\omega$, the drive force $F_d$ may be acquired rapidly and accurately by the known drive force observer. Due to this, with an electric automobile generating an actual torque value $T_r$, which is faithful to the torque instruction value, for example, it is possible to calculate the friction coefficient $\mu$ rapidly and accurately by providing a rotational speed sensor that detects the rotational speed of the driving wheel WH, in addition to the load sensor described above.

Note that a drive force observer is described in, for example, Japanese Laid-Open Patent Publication 2010-05116, etc.

Moreover, in the driving wheel model described above, the slip ratio $\lambda$ is given by the following Equation (11):

$$\lambda = (r \cdot \omega - v) / \text{Max}(r \cdot \omega, v) \quad (11)$$

Figure 3:
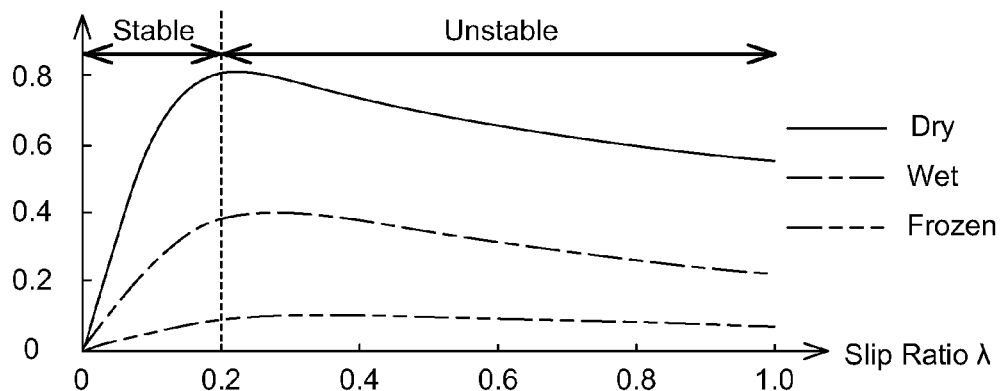
FIG. 3 is the figure showing a relationship between slip ratio and friction coefficient during driving.
Figure 4:
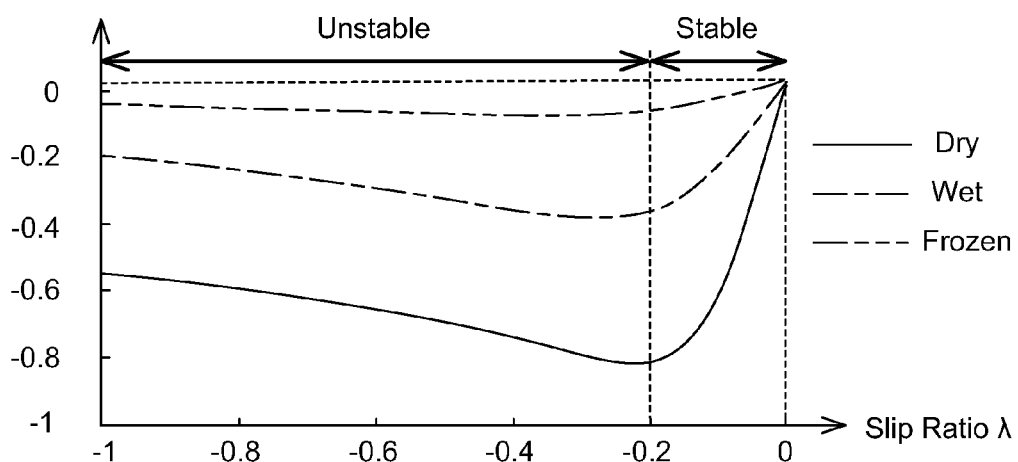
FIG. 4 is the figure showing a relationship between slip ratio and friction coefficient during braking.

In the driving wheel model, generally, the friction coefficient $\mu$ and the slip ratio $\lambda$ have a relationship as shown in FIG. 3 during driving, and they have the relationship as shown in FIG. 4 during vehicle braking. In the change of the friction coefficient $\mu$ during driving along with increase of the slip ratio shown in FIG. 3, the status for the moving body MV enables to travel in a stable manner (hereinafter termed a "stable state") is that when the slip ratio is not larger than the slip ratio (generally around 0.2) at which the friction coefficient $\mu$ becomes maximum. On the other hand, the status for the free spinning of the driving wheel WH or the phenomenon of locking may occur (hereinafter termed an "unstable state") is that when the slip ratio is not less than the slip ratio at which the friction coefficient $\mu$ becomes maximum.

Moreover, in the change during braking of the friction coefficient $\mu$ along with increase of the slip ratio shown in FIG. 4, the stable state is that the slip ratio is not less than the slip ratio (generally around −0.2) at which the friction coefficient $\mu$ becomes minimum. On the other hand, the unstable state is that the slip ratio is smaller than the slip ratio at which the friction coefficient $\mu$ becomes minimum.

Furthermore, after the radius r has been substituted into Equation (8) above, the sum of the left side and the right side with those of (9) is formed, the following Equation (12) is obtained:

$$M \cdot r \cdot (dv/dt) + J_w \cdot (d\omega/dt) = T_r - r \cdot F_{dr} \quad (12)$$

During driving in which (r·ω>v), when Equation (11) is considered, the Equation (12) changes as per the following Equation (13):

$$M \cdot r \cdot v \cdot s + J_w \cdot \omega \cdot s = M \cdot r \cdot (1-\lambda) \cdot r \cdot \omega \cdot s + J_w \cdot \omega \cdot s \quad (13)$$
$$= \omega \cdot (J_w + M \cdot r^2 \cdot (1-\lambda)) \cdot s$$
$$= T_r - r \cdot F_{dr}$$

Accordingly, the rotational speed ω is given by the following Equation (14):

$$\omega = (T_r - r \cdot F_{dr}) / ((J_w + M \cdot r^2 \cdot (1-\lambda)) \cdot s) \quad (14)$$

As determined from Equation (14), when the traveling resistance $F_{dr}$ becomes small, the rotational speed ω becomes great. In traction control, in order to perform control for preventing the rotational speed ω increasing abruptly even when the traveling resistance $F_{dr}$ is small, a model is employed in which it is considered that the traveling resistance $F_{dr}$ is zero. As a result, the transfer function from the actual torque value $T_r$ to the rotational speed ω in the actual vehicle model during driving, in other words the transfer function P(s) of the above described driving wheel response block 620 during driving, is as shown in the following Equation (15):

$$P(s) = \omega / T_r = 1 / ((J_w + M \cdot r^2 \cdot (1-\lambda)) \cdot s) \quad (15)$$

Moreover, since the adhesion model described above is a model in which slip of the driving wheel WH does not occur, it is a model in which the slip ratio λ is taken as being zero. Due to this, the transfer function $P_n^{-1}(s)$ of the adhesion model block 720 during driving is as given by the following Equation (16):

$$P_n^{-1}(s) = T_r / \omega = (J_w + M \cdot r^2) \cdot s \quad (16)$$

Note that, during braking, the transfer function P(s) of the driving wheel response block 620 and the transfer function Pn−1(s) of the adhesion model block 720 may be derived in a similar manner to the case described above during driving. The following explanation will principally give attention to the case during driving.

As described above, the transfer function G(s) in the traction control system of the embodiment from the torque instruction value $T^*_m$ to the rotational speed ω during driving, and the open loop transfer function $G_0(s)$ from the torque instruction value $T^*_m$ to the correction amount $T_b$, may be expressed by the following Equations (17) and (18):

[Equation #1]

$$G(s) = \frac{e^{-Ls} \frac{1}{(\tau_1 s+1)} \frac{1}{(J_w + Mr^2(1-\lambda))} \frac{1}{s}}{1 + e^{-Ls} \frac{1}{(\tau_1 s+1)} \frac{k}{(\tau s+1)} \frac{Mr^2 \lambda}{(J_w + Mr^2(1-\lambda))}} \Lambda \quad (17)$$

[Equation #2]

$$G_o(s) = e^{-Ls} \frac{1}{(\tau_1 s+1)} \frac{k}{(\tau s+1)} \frac{Mr^2 \lambda}{(J_w + Mr^2(1-\lambda))} \Lambda \quad (18)$$

[Stability of this Traction Control System]

In order to evaluate the stability of the traction control system described above, a simulation of the type described below was performed. In the simulation, note that it was supposed that the moving body MV was a four wheel drive vehicle, and that, as is considered to be typical for such a vehicle, the dead time L=20 [msec], the time constant of the torque response of the motor $\tau_1$=10 [msec], the driving wheel WH moment of inertia $J_W$=5.7 [kg·m²], the moving body MV weight M=1650 [kg], and the driving wheel WH radius r=0.295 [m].

<Simulations Related to the Transfer Function G(s)>

Simulations, in the case that the torque instruction value $T^*_m$ was 400 [Nm], were performed related to the transfer function G(s), while the time constant τ of the first-order delay block described above and the gain coefficient of the gain multiplication block were changed.

First, under the supposition of traveling over a frozen road surface as shown in FIG. 3, while keeping the time constant τ fixed at 4.0 [sec], and while varying the gain coefficient 'k', simulations were performed for changes over time of the slip ratio λ, of the friction coefficient μ, and of the torque command value $T_m$. The results of these simulations are shown in FIG. 5.

Figure 5:
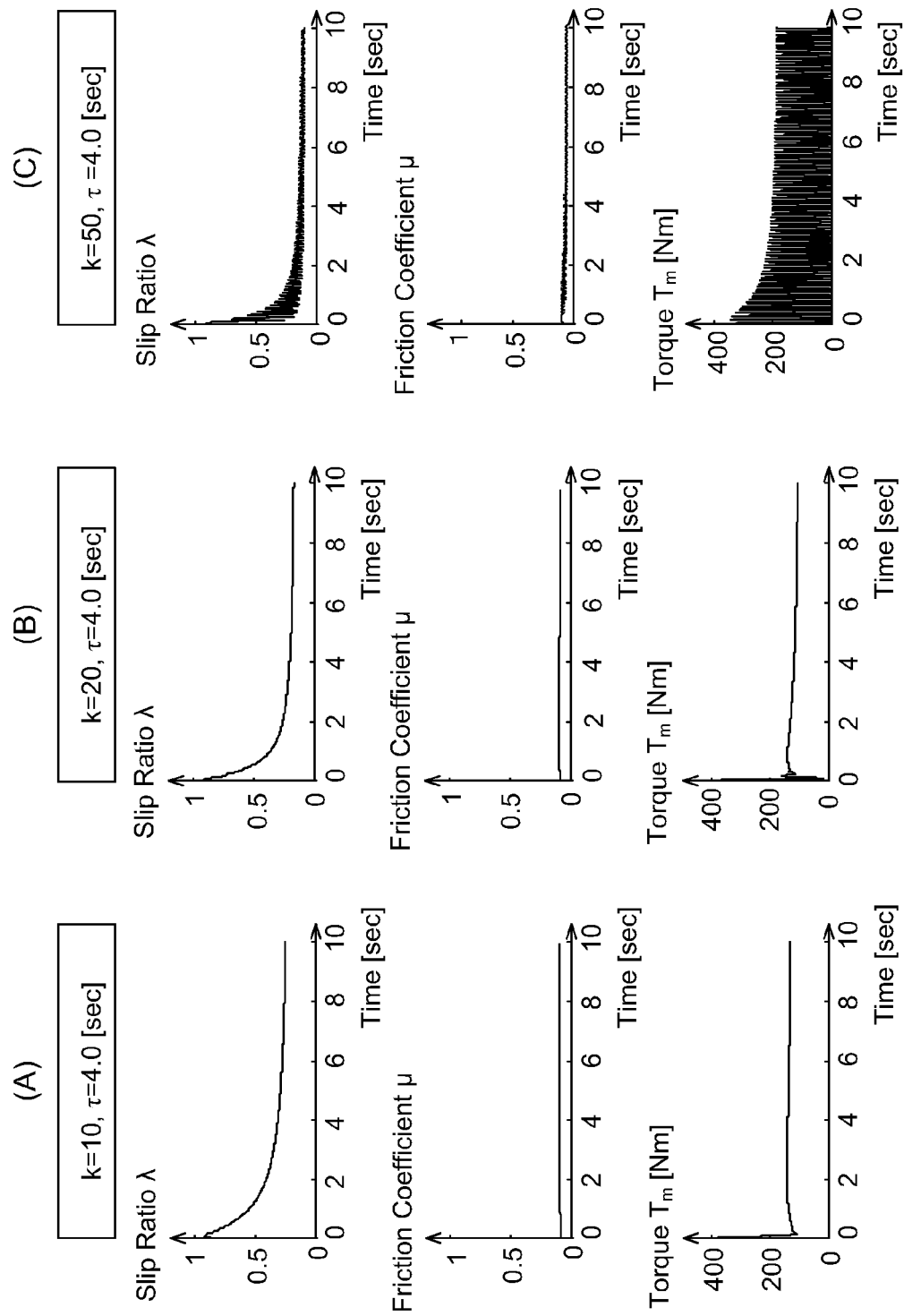
FIG. 5 is the figure showing simulation results to the frozen road by using varied gain coefficient 'k' and fixed a time constant τ in the model following control system of FIG. 1.

As is shown by the simulation results in FIG. 5, when the gain coefficient 'k' became large, the degree of decrease of the slip ratio became high. However, when the gain coefficient 'k' became too great, the control oscillated and became unstable, which was undesirable.

Next, under the supposition of traveling over a frozen road surface as shown in FIG. 3, while keeping the gain coefficient 'k' fixed at 10, and while varying the time constant τ, simulations were performed for changes over time of the slip ratio λ, of the friction coefficient μ, and of the torque command value $T_m$. The results of these simulations are shown in FIG. 6.

Figure 6:
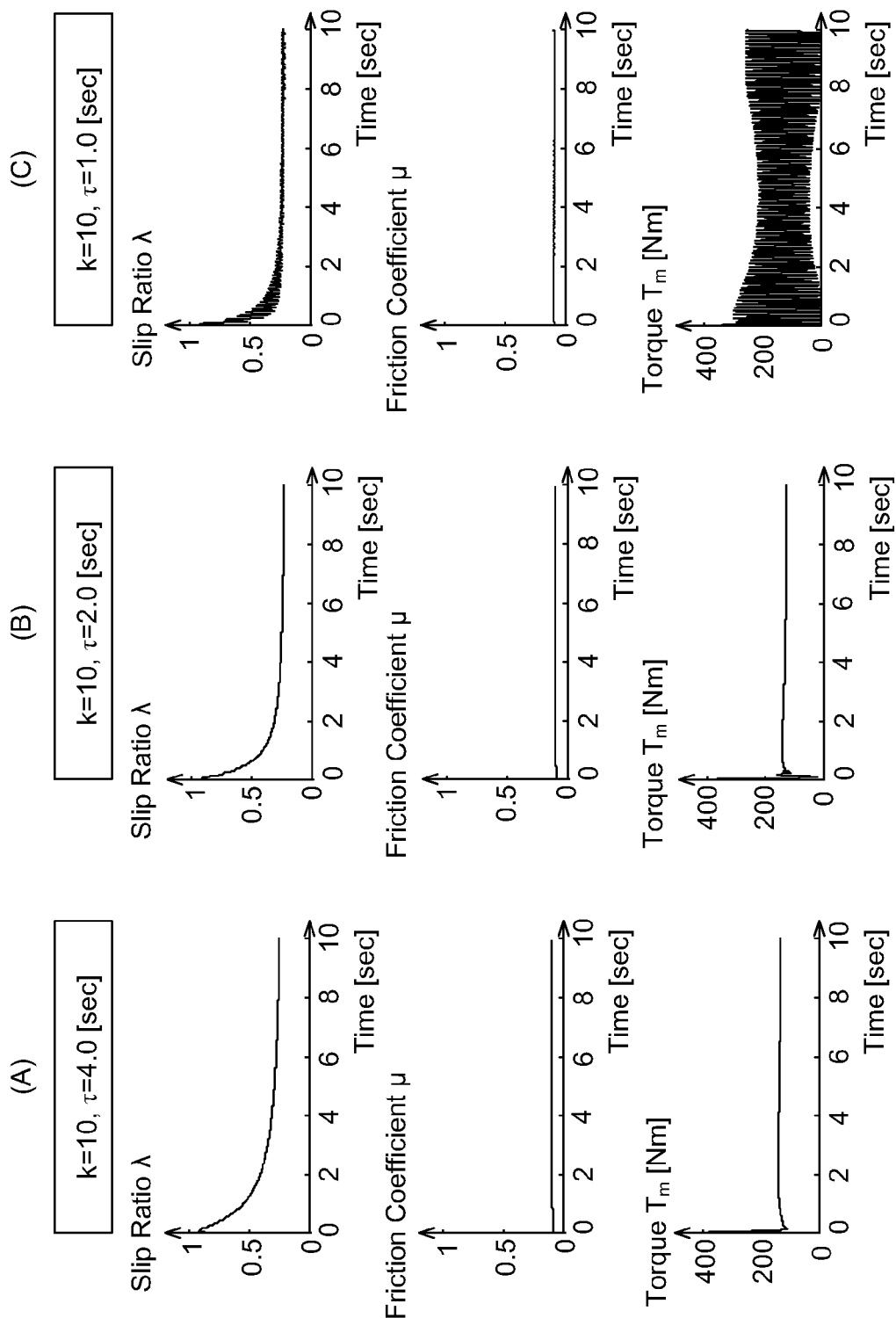
FIG. 6 is the figure showing simulation results to the frozen road by using the fixed gain coefficient 'k' and the varied time constant τ.
Figure 7:
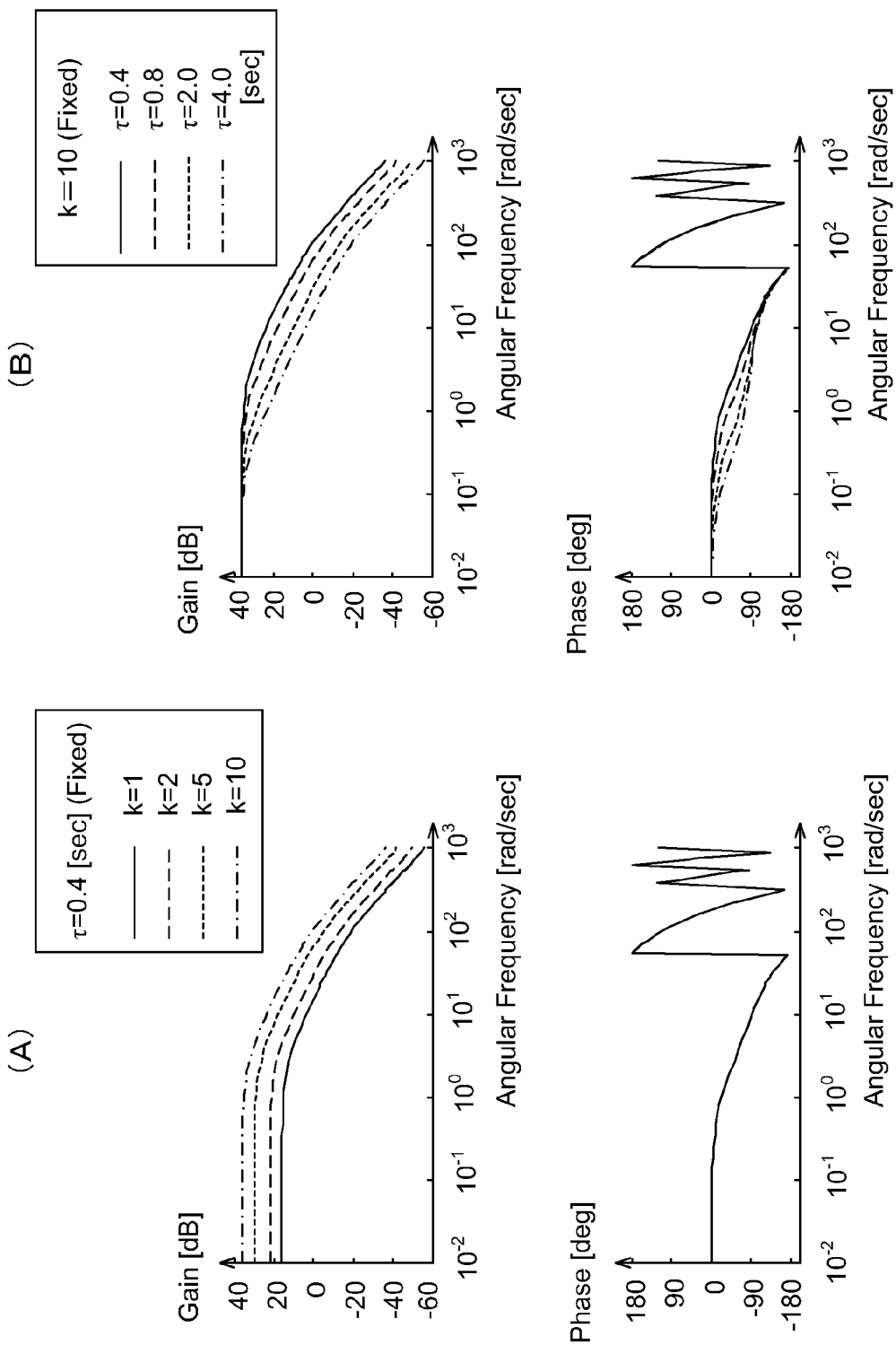
FIG. 7 is the first figure showing Bode diagrams for an open loop transfer function of the model following control system of FIG. 1.

As is shown by the simulation results in FIG. 6, when the time constant τ became small, the slip ratio rapidly decreased. However, when the time constant τ became too small, the control oscillated and became unstable, which was undesirable.

From these two types of simulation result related to the transfer function G(s) described above, it was confirmed that, in order for control stability and slip suppression performance to be compatible, it is necessary for the gain coefficient 'k' and the time constant τ to be coordinated in an appropriate manner.

<Evaluation of the Control Stability According to the Open Loop Transfer Function $G_0(s)$>

From (18) above, it is determined that the slip ratio λ is related to the gain of the open loop transfer function $G_0(s)$. The closer the slip ratio λ is to "1", the greater the gain of the open loop transfer function $G_0(s)$ becomes. Due to this, for ensuring the stability of the traction control system whatever value the slip ratio λ make take, it will be sufficient if it is possible to ensure the stability under the condition that the slip ratio λ is "1", which is when the gain is largest.

Thus, the stability of the open loop transfer function with the slip ratio λ set to "1" in the following Equation (18) was evaluated by drawing a Bode diagram and obtaining the gain margin and the phase margin. Note that it is generally considered that the criteria for ensuring stability are that the gain margin should be 10 [dB] or greater and that the phase margin should be 40 [deg] or greater.

Moreover note that, when drawing a Bode diagram in order to evaluate the above stability, in a similar manner to the case of the simulation related to the transfer function G(s) described above, it was supposed that the moving body MV is a four wheel drive vehicle, that the dead time L=20 [msec], and that the time constant for the torque response of the motor $\tau_1$=10 [msec]. Moreover, with regard to the dynamic values appearing in Equation (18), it was supposed that the driving wheel WH moment of inertia $J_W$=5.7 [kg·m²], the moving body MV weight M=1650 [kg], and the driving wheel WH radius r=0.295

First, a Bode diagram was constructed with the time constant τ fixed and while changing the gain coefficient 'k'. The result is shown in FIG. 7(A). As shown in this FIG. 7(A), the greater the gain coefficient 'k' was, the higher became the frequency at which the gain intersected 0 [dB], and the gain margin and the phase margin both became small.

The concrete Bode diagram shown in FIG. 7(A) is an example in which the time constant τ was fixed at 0.4 [sec], while the gain coefficient 'k' was changed through 1, 2, 5, and 10. In this concrete example shown in FIG. 7(A), when the gain coefficient 'k' was 1, the gain margin was 12.1 [dB] and the phase margin became 72.9 [deg], so that this situation can be evaluated as being stable. However, when the gain coefficient 'k' was 2, 5, and 10, the gain margin and the phase margin both became small, and this situation cannot be evaluated as being stable.

Next, a Bode diagram was constructed with the gain coefficient 'k' fixed, and while changing the time constant τ. The result is shown in FIG. 7(B). As shown in this FIG. 7(B), the greater the time constant τ was, the lower became the frequency at which the gain intersected 0 [dB], and the gain margin and the phase margin were both large.

The concrete Bode diagram shown in FIG. 7(B) is an example in which the gain coefficient 'k' was fixed at 10, while the time constant τ was changed through 0.4, 0.8, 2.0, and 4.0 [sec]. In this concrete example shown in FIG. 7(B), when the time constant τ was 0.4, 0.8, and 2.0 [sec], the gain margin and the phase margin both became small, and this situation cannot be evaluated as being stable. However, when the time constant τ was 4.0 [sec], the gain margin was 11.8 [dB] and the phase margin became 64.3 [deg], so that this situation can be evaluated as being stable.

From the results in FIGS. 7(A) and 7(B) it was determined that, in order to ensure stability, if the gain coefficient 'k' is made large, then it is necessary also to make the time constant τ large. Thus, a Bode diagram was drawn while changing the gain coefficient 'k' and the time constant τ by using the relationship shown by Equation (19) below:

$$\tau = 0.4 \times k \quad (19)$$

This result is shown in FIG. 8. As shown in this FIG. 8, using the relationship shown in Equation (19), when the gain coefficient 'k' and the time constant τ changed, the result was that the frequency at which the gain crossed 0 [dB] and the phase crossed −180 [deg] almost agreed with one another. In other words, the result was that the gain margin and the phase margin almost did not change. This shows that, by changing the time constant τ to match the gain coefficient 'k', it is possible to ensure stability by adjusting the control band.

And the result described above shows that it is possible to express the relationship between the gain coefficient 'k' and the time constant τ for ensuring the stability of the control band by the following Equation (20):

$$\tau = a \cdot k \quad (20)$$

Here, as will be understood by reference to Equation (18) above, the optimum value of the coefficient 'a' is determined according to the dead time L, the time constant $\tau_1$ of the torque response of the motor, the moment of inertia $J_W$, the weight M of the moving body MV, and the radius r of the driving wheel WH. Since these values are values that are determined by the design specification of the vehicle, accordingly they can be ascertained if that design specification is already known.

Even if the design specification is not known, these values can be estimated, or can be ascertained by actual measurement.

Even if the result is that the gain coefficient 'k' changes dynamically, it is still possible to implement traction control that always ensures the control band and the stability by setting the time constant τ according to Equation (20) above, using a coefficient 'a' that is determined by estimation in advance or whose value can be ascertained.

Figure 9:
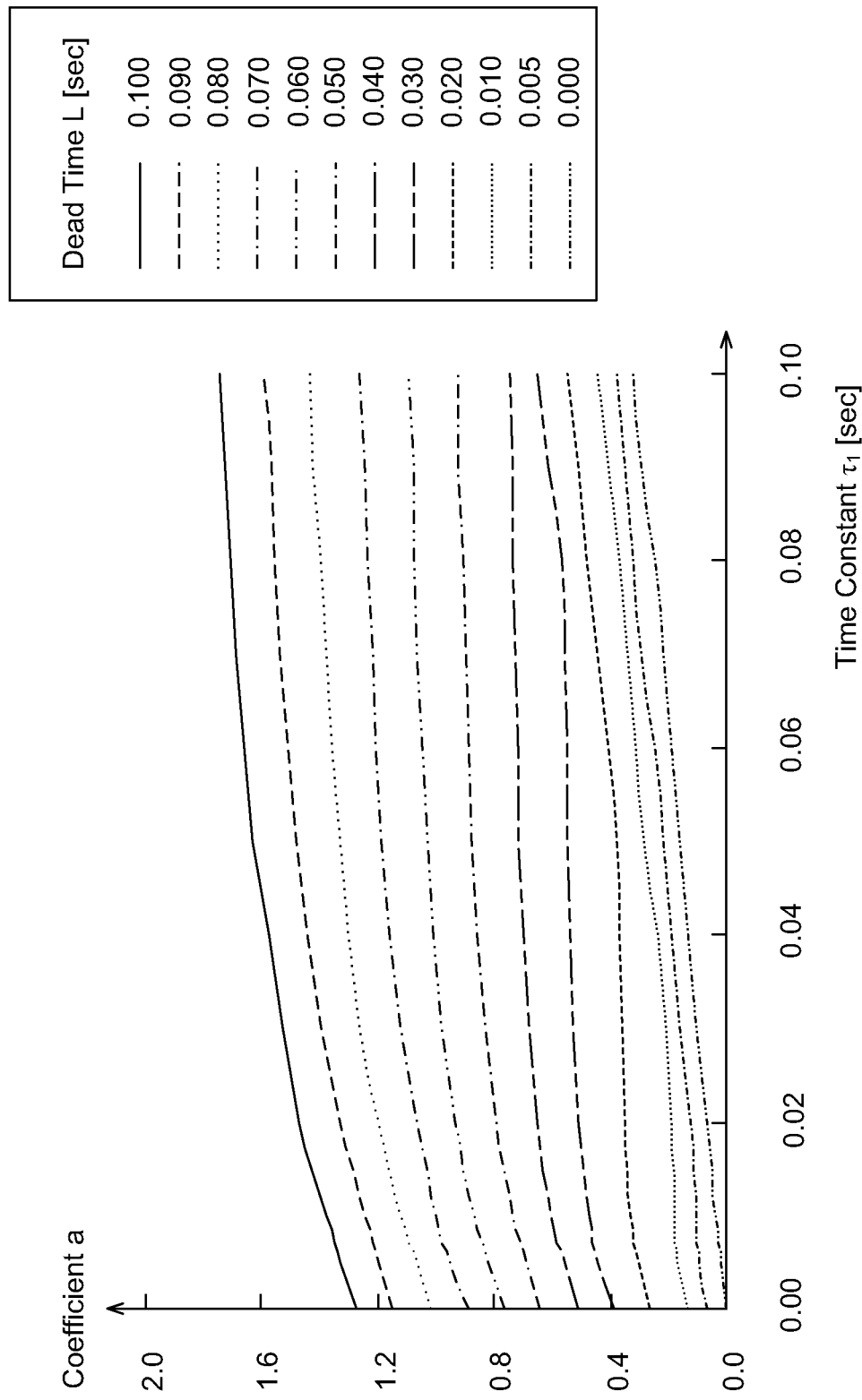
FIG. 9 is the figure showing changes of the optimum value of a coefficient 'a' corresponding to both of the changes of a dead time L and the time constant $\tau_1$ for torque response.

If, as hypothesized when drawing the concrete Bode diagrams described above, the driving wheel WH moment of inertia $J_W$=5.7 [kg·m2], the moving body MV weight M=1650 [kg], and the driving wheel WH radius r=0.295 [m], then change of the coefficient 'a' according to change of the combination of the dead time L and the time constant $\tau_1$ of the torque response of the motor is shown in FIG. 9.

Note that, when determining the coefficient 'a', it is desirable to employ a value that is a little greater than the above optimum value, so as to be able to anticipate a margin that is somewhat wider in order to ensure stability. For example, in the example of FIG. 9 in which the dead time L=20 [msec] and the time constant $\tau_1$ of the torque response of the motor=10 [msec], then, while the optimum value for the coefficient 'a' is 0.33, in order to ensure a certain margin, it is desirable to set the coefficient 'a' to 0.4, in order to ensure accurate stability of the traction control system of FIG. 1 described above.

[Determination of the Adaptive Gain Coefficient 'k' and the Time Constant τ for the Road Surface State]

Next, the determination of the adaptive gain coefficient 'k' and of the time constant τ according to the road surface state will be explained.

As shown in FIG. 3 above, the relationship between the slip ratio of the driving wheel WH and the friction coefficient of the driving wheel WH upon the road surface varies greatly according to the state of the road surface, such as whether it is a dry road surface, a wet road surface, a frozen road surface, or the like. As described above, this is equivalent to the fact that the change of the disturbance inputted to the control system is great.

Therefore, both for a dry road surface and for a frozen road surface, simulation was performed for changes over time of the slip ratio λ, of the friction coefficient μ, and of the torque command value $T_m$, with the torque instruction value $T^*_m$ being 400 [Nm]. Note that, during this simulation, it was supposed that the moving body MV was a four wheel drive vehicle, and, as is considered to be typical for such a vehicle, that the dead time L=20 [msec], the time constant of the torque response of the motor $\tau_1$=10 [msec], the driving wheel WH moment of inertia $J_W$=5.7 [kg·m²], the moving body MV weight M=1650 [kg], and the driving wheel WH radius r=0.295 [m]. Moreover, in order to ensure the stability of the following control system, the simulation was performed for the two (k, τ) pairs of (1, 0.4 [sec]) and (10, 4 [sec]), which satisfied the relationship described in Equation (19) above.

The simulation result in this case is shown in FIG. 10. Here, the simulation result for the case of a frozen road surface is shown in FIG. 10(A), while the simulation result for the case of a dry road surface is shown in FIG. 10(B). As shown in FIGS. 10(A) and 10(B), it will be understood that, for both of these road surfaces, the slip ratio λ decreases when the gain coefficient 'k' is great.

By the way, in the case of a frozen road surface, in order to prevent free spinning of the driving wheel WH as much as practicable, it is desirable to keep the slip ratio λ as small as possible while keeping the gain as high as possible. However, as shown in FIG. 10(B), when the gain coefficient is made great in order to make the gain high, on a dry road surface, the torque command value Tm is decreased undesirably, irrespective of whether there is any margin in the value of the friction coefficient μ. Unnecessary reduction of the torque command value $T_m$ means that it is not possible to provide the acceleration level intended by the driver, so that, in terms of convenience, the drive force is compromised.

For example, as described above, high drive force is required if acceleration is needed while the vehicle is traveling upon a dry road surface, or if the vehicle is traveling up a slope, or during high speed traveling or the like. In this type of circumstance it is desirable to avoid reduction of the drive force to the greatest possible extent, in order to be able to deploy the highest drive capability of which the vehicle is capable. In other words, it is not sufficient simply to make the slip ratio λ small; it is also necessary to control the slip ratio λ so that the unstable region is not entered, while still ensuring the required drive force.

Due to this, it is desirable to determine the gain coefficient in an adaptive manner according to the road surface state, so that the gain coefficient 'k' is large in the case of a road surface such as a frozen road surface on which slip can easily occur, while the gain coefficient 'k' is small in the case of a road surface such as a dry road surface upon which slip does not easily occur. Thus, as shown in FIG. 3 above, by changing the operational mode in correspondence to the road state, the relationship between the slip ratio of the driving wheel WH and the friction coefficient of the driving wheel WH with respect to the road surface is determined to have the characteristic that, the more prone to slip the road surface becomes, the smaller the friction coefficient μ becomes with respect to the slip ratio λ.

If, using this characteristic, the gain coefficient 'k' is set to be larger the greater the slip ratio λ is, or the smaller the friction coefficient μ is, then the gain coefficient 'k' becomes large for a road surface upon which slip can easily occur, while the gain coefficient 'k' becomes small for a road surface upon which slip cannot easily take place. As a result, along with the beneficial effect for preventing slip being enhanced for a road surface upon which slip can easily occur, also unnecessary reduction of torque for a road surface upon which slip cannot easily take place is prevented.

Here, the gain coefficient 'k' may be calculated according to the following Equation (21), in which the coefficient 'b' is a predetermined value:

$$k = b \cdot (\lambda/\mu) \quad (21)$$

Since, according to this Equation (21), the gain coefficient 'k' is proportional to the slip ratio λ while being inversely proportional to the friction coefficient μ, accordingly the larger the gain coefficient 'k' is, the more easily slip can occur. Note that, if the time constant τ is set according to the gain coefficient 'k' by using Equation (20) above, then it is possible successfully to ensure the stability of traction control and the control band. In other words, the gain coefficient 'k' and the time constant τ come to be set adaptively, according to the estimated value of λ and the estimated value of μ during traveling.

Note that the coefficient 'b' is set to an appropriate value according to the moment of inertia $J_W$ of the driving wheel WH, the weight M of the moving body MV, and the radius r of the driving wheel WH. Due to this, the coefficient 'b' can be determined to an appropriate value in advance by simulation and experiment. When determining the above coefficient 'b', consideration is given to the balance between high gain upon a frozen road surface and low gain upon a dry road surface.

Note that, if the dead time L=20 [msec], the time constant of the torque response of the motor $\tau_1$=10 [msec], the driving wheel WH moment of inertia $J_W$=5.7 [kg·m$^2$], the moving body MV weight M=1650 [kg], and the driving wheel WH radius r=0.295 [m], then "4" may be obtained by simulation and experiment as a desirable value for the coefficient 'b'. If the coefficient (b=4) obtained in this manner is employed, then examples of the gain coefficients determined according to Equation (21) are as follows.

For example, in the case of the frozen road surface of FIG. 3, when the slip ratio λ is 0.25, the friction coefficient μ is approximately 0.1. Since this operational point is at the boundary between the stable region and the unstable region where the slip ratio starts to increase, accordingly it is desirable to enhance the performance for suppression of slip. For example, if the coefficient 'b' is set to "4", then the gain coefficient 'k' becomes 10 only to be a high gain setting, so that a high gain setting results.

Moreover, for example, in the case of the dry road surface of FIG. 3, when the slip ratio λ is 0.05, the friction coefficient μ is approximately 0.4. Since this operational point is a state where there is some room with respect to the maximum value of the friction coefficient μ, accordingly it is desirable to avoid unnecessary decrease of the torque. For example, if the coefficient 'b' is set to "4", then the gain coefficient 'k' becomes 0.5 only to be a high gain setting, so that a low gain setting results.

Note that, at the operational point which, on a dry road surface, is the boundary between the stable region and the unstable region (slip ratio λ=0.2, friction coefficient μ≈0.8), if the coefficient 'b' is "4", then the gain coefficient 'k' becomes 1.0. At this operational point on the boundary the gain appears to be low, but no particular problem occurs. The reason for this is as follows.

For a normal vehicle, it is not appropriate to be able to generate a torque much greater than the drive force at which the friction coefficient μ upon a dry road surface becomes maximum. The reason why is that it is never necessary to output a torque much larger than this drive force, and that there is no merit in increasing the weight of the motor or in increasing the cost. Due to this, even if the torque becomes higher than the drive force at which the friction coefficient μ becomes maximum, the difference between them is not very great, and, since the torque reduction amount due to control remains quite small, accordingly it is no matter even if the gain coefficient 'k' is kept as low as 1.

On the other hand, in the case of a frozen road surface, then, even with a low torque instruction value, a drive force can simply be obtained that makes the coefficient μ attain its maximum value. In other words, the slip state is encountered very easily even if the accelerator pedal is not stepped upon very much. Since a large torque instruction value is obtained when the accelerator pedal is strongly stepped upon, the difference from the drive force when the friction coefficient μ becomes maximum is great, so that the torque reduction amount due to traction control needs to be great.

Note that, if emphasis is given to suppression of slip upon a frozen road surface, then it is proper to make the coefficient 'b' large so that the gain is increased. On the other hand, if emphasis is given to avoidance of unnecessary decrease of the torque upon a dry road surface, then it is proper to make the coefficient 'b' small, so that the gain is reduced.

Moreover, since the weight of the vehicle changes according to the number of people riding in it or the weight loaded into it, accordingly, if it is possible to detect the weight of the vehicle, then it is possible to set the coefficient 'b' according to the result of this detection. For example, if the inertia $J_W$=5.7 [kg·m$^2$], the moving body MV weight M=1650 [kg], and the driving wheel WH radius r=0.295 [m], and the coefficient b=4, then at the operational point upon a frozen road surface of FIG. 3 where the slip ratio λ=0.25 and the friction coefficient μ=0.1, the gain in Equation (18) is "2.57". If the weight of the moving body MV is increased by 400 [kg] with the coefficient 'b' remaining the same at b=4, then this gain becomes "2.85". But, if it is desired for this gain to be the same at "2.57" as when the weight of the moving body MV was M=1650 [kg], then this can be implemented by making the coefficient b=3.6.

While the traction control system has been explained above with particular emphasis upon its behavior during driving, it is possible to employ model following control during braking as well, in a similar manner to the case during driving.

[The Traction Control Device]

Next, a traction control device 300 of the embodiment will be explained with principal reference to FIG. 11. Note that this traction control device 300 is arranged within a moving body MV.

<Configuration>

Figure 11:
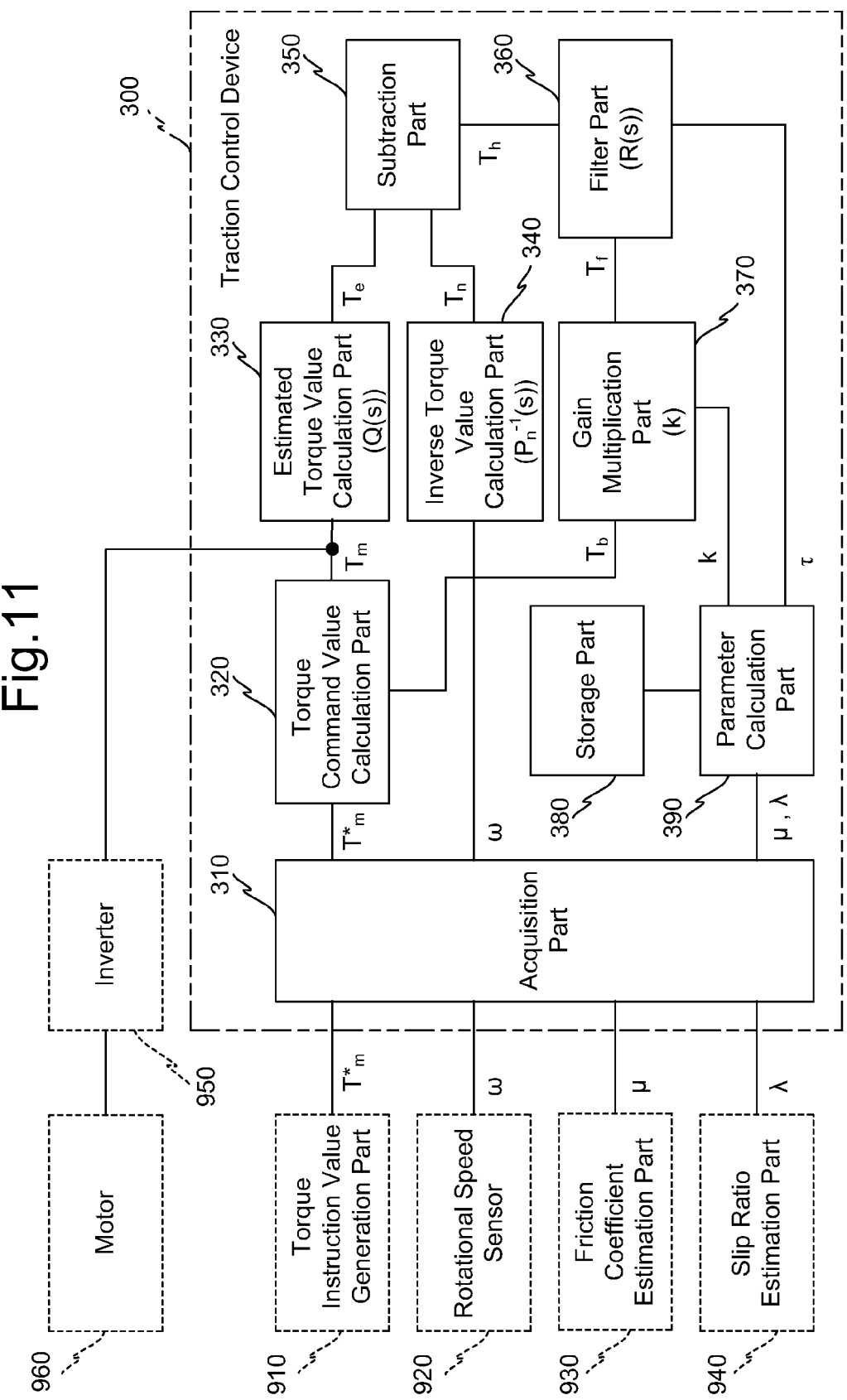
FIG. 11 is the block diagram schematically showing the configuration of a traction control device of an embodiment of the present invention.

Here, the schematic configuration of the traction control device 300 is shown in FIG. 11 as a block diagram. As shown in this FIG. 11, the traction control device 300 comprises an acquisition part 310, a torque command value calculation part 320, an estimated torque value calculation part 330, and an inverse torque value calculation part 340. Moreover, the traction control device 300 comprises a subtraction part 350, a filter part 360, and a gain multiplication part 370. Yet further, the traction control device 300 comprises a storage part 380 and a parameter calculation part 390.

The acquisition part 310 acquires the torque instruction value $T^*_m$ that is sent from a torque instruction value generation part 910. And the acquisition part 310 sends this torque instruction value $T^*_m$ that has been acquired to the torque command value calculation part 320.

Then the torque instruction value generation part 910 generates the torque instruction value $T^*_m$ on the basis of the detection results from an accelerator opening amount sensor, a braking amount sensor, an angular velocity sensor and so on not shown in the figures that are used in the generation of the torque instruction value $T^*_m$. The torque instruction value $T^*_m$ that has been generated in this manner is sent to the traction control device 300.

Moreover, the acquisition part 310 acquires a rotational speed ω that is sent from a rotational speed sensor 920. And the acquisition part 310 sends this rotational speed ω that has been acquired to the inverse torque value calculation part 340.

Here, the rotational speed sensor 920 detects the rotational speed ω of the driving wheel WH of the moving body MV. The rotational speed that has been detected in this manner is sent to the traction control device 300.

Moreover, the acquisition part 310 acquires a friction coefficient μ that is sent from a friction coefficient estimation part 930. And the acquisition part 310 sends this friction coefficient μ that has been acquired to the parameter calculation part 390.

Here, the function of the known drive force observer as described in, for example, Japanese Laid-Open Patent Publication 2010-051160 may be implemented in the friction coefficient estimation part 930. According to this drive force observer function, this friction coefficient estimation part 930 estimates the drive force $F_d$ upon the driving wheel WH on the basis of the rotational speed ω detected by the rotational speed sensor 920, and upon the actual torque value $T_r$ that is calculated from the result of detection by a current sensor not shown in the figures that detects the current flowing in the motor 960. And, on the basis of the estimated drive force $F_d$ and the normal force N operating upon the drive wheel WH as detected by a load sensor or the like not shown in the figures, the friction coefficient estimation part 930 estimates the friction coefficient μ using Equation (10) given above. The friction coefficient μ that has been estimated in this manner is sent to the traction control device 300.

Furthermore, the acquisition part 310 acquires the slip ratio λ from a slip ratio estimation part 940. And the acquisition part 310 sends the slip ratio λ that has thus been acquired to the parameter calculation part 390.

And the slip ratio estimation part 940 estimates the speed v of the moving body MV by performing integration with respect to time of the acceleration detected by an acceleration sensor not shown in the figures, or the like. And, using Equation (11) given above, the slip ratio estimation part 940 estimates the slip ratio λ on the basis of the speed v that has thus been estimated and the rotational speed ω detected by the rotational speed sensor 920. The slip ratio that has been estimated in this manner is sent to the traction control device 300.

The torque command value calculation part 320 performs the function of the subtraction block 500. This torque command value calculation part 320 receives the torque instruction value $T^*_m$ sent from the acquisition part 310 and a correction amount $T_b$ sent from the gain multiplication part 370. And the torque command value calculation part 320 calculates the torque command value $T_m$ by using Equation (2) given above. The torque command value $T_m$ that has been calculated in this manner is sent to an inverter 950, and is also sent to the estimated torque value calculation part 330.

Here, the inverter 950 generates a motor drive signal according to the torque command value $T_m$ sent from the traction control device 300, and sends this motor drive signal that has been generated to a motor 960. The result is that the motor 960 performs motor rotational motion on the basis of this motor drive signal, and thereby causes the driving wheel to rotate.

The estimated torque value calculation part 330 performs the function of the torque transmission block 710. This estimated torque value calculation part 330 internally stores a dead time L and a time constant $\tau_1$ for the torque response of the motor 960.

The estimated torque value calculation part 330 receives the torque command value $T_m$ sent from the torque command value calculation part 320. And the estimated torque value calculation part 330 performs torque value estimation by calculating an estimated torque value $T_e$ using Equation (3) given above. The estimated torque value $T_e$ that has been calculated in this manner is sent to the subtraction part 350.

The inverse torque value calculation part 340 performs the function of the adhesion model block 720. This inverse torque value calculation part 340 stores the driving wheel WH moment of inertia $J_W$, the weight M of the moving body MV, and the radius r of the driving wheel WH.

The inverse torque value calculation part 340 receives the rotational speed w sent from the acquisition part 310. And the inverse torque value calculation part 340 calculates the inverse torque value $T_n$ by using Equation (4) given above. The inverse torque value $T_n$ that has been calculated in this manner is sent to the subtraction part 350.

The subtraction part 350 performs the function of the subtraction block 730. This subtraction part 350 receives the estimated torque value $T_e$ sent from the estimated torque value calculation part 330 and the inverse torque value $T_n$ sent from the inverse torque value calculation part 340. And the subtraction part calculates the differential torque value $T_h$ by using Equation (5) given above. The differential torque value $T_h$ that has been calculated in this manner is sent to the filter part 360.

The filter part 360 performs the function of the first-order delay block 740. This filter part 360 receives the differential torque value $T_h$ sent from the subtraction part 350 and the time constant τ sent from the parameter calculation part 390. And, using Equation (6) given above, the filter part 360 calculates the torque value after filtering $T_f$ by executing first-order delay processing with the time constant τ upon the differential torque value $T_h$. The torque value after filtering $T_f$ calculated in this manner is sent to the gain multiplication part 370.

The gain multiplication part 370 performs the function of the gain multiplication block 750. This gain multiplication part 370 receives the torque value $T_f$ after filtering sent from the filter part 360 and the gain coefficient 'k' sent from the parameter calculation part 390. And the gain multiplication part 370 calculates the correction amount $T_b$ by using Equation (7) given above. The correction amount $T_b$ that has been calculated in this manner is sent to the torque command value calculation part 320.

The storage part 380 comprises a non-volatile storage element. The coefficient 'a' that, as described above, is determined by the dead time L, the time constant $τ_1$ for the torque response of the motor, the moment of inertia $J_W$, the weight M of the moving body MV, and the radius r of the driving wheel WH, and that is required when utilizing Equation (20) given above, is stored in this storage part 380. Moreover, the coefficient 'b' that, as described above, is determined by the dead time L, the time constant $τ_1$ for the torque response of the motor, the moment of inertia $J_W$, the weight M of the moving body MV, and the radius r of the driving wheel WH, and that is required when utilizing Equation (21) given above, is also stored in the storage part 380.

Note that the parameter calculation part 390 is capable of accessing the storage part 380.

The parameter calculation part 390 receives the friction coefficient μ and the slip ratio λ sent from the acquisition part 310. And the parameter calculation part 390 refers to the coefficient 'b' that is stored in the storage part 380, and calculates the gain coefficient 'k' by using Equation (21) given above. Moreover, by using Equation (20) given above, the parameter calculation part 390 subsequently calculates the time constant τ by referring to the coefficient 'a' stored in the storage part 380.

The gain coefficient 'k' that has been calculated in this manner is sent to the gain multiplication part 370. Moreover, the time constant τ that has been calculated is sent to the filter part 360.

Note that, while the moment of inertia $J_W$, the weight M of the moving body MV, and the radius r of the driving wheel WH are already known, if either the dead time L or the time constant $τ_1$ of the torque response of the motor is not known, then it is not possible to determine the coefficient 'a'. In such a case, a relationship like the one shown by way of example in FIG. 9 described above between the coefficient 'a', the dead time L, and the time constant $τ_1$ is registered in the storage part 380. And, at the time point that the dead time L and the time constant $τ_1$ have become known by actual measurement or the like, the coefficient 'a' may be determined by reference to the above table, and may be stored in the storage part 380.

<Operation>

Next, the operation for traction control performed by the traction control device 300 having a configuration such as that described above will be explained. This traction control is performed while the moving body MV is traveling.

Note that it will be supposed that the torque instruction value $T^*_m$ generated from the torque instruction value generation part 910 is sequentially sent to the traction control device 300. Moreover, it will be supposed that the rotational speed ω from the rotational speed sensor 920 is sequentially sent to the traction control device 300. Furthermore, it will be supposed that the estimated friction coefficient μ from the friction coefficient estimation part 930 is sequentially sent to the traction control device 300. Yet further, it will be supposed that the estimated slip ratio λ from the slip ratio estimation part 940 is sequentially sent to the traction control device 300.

And it will be supposed that the acquisition part 310 sequentially sends the torque instruction value $T^*_m$ that it has acquired to the torque command value calculation part 320. Moreover, it will be supposed that the acquisition part 310 sequentially sends the rotational speed ω that it has acquired to the inverse torque value calculation part 340. Additionally, it will be supposed that the acquisition part 310 sequentially sends the friction coefficient μ and the slip ratio λ that it has acquired to the parameter calculation part 390.

Moreover, it will be supposed that the coefficients 'a' and 'b' are stored within the storage part 380.

Under this sort of operational environment, when the moving body MV is traveling, the parameter calculation part 390 calculates the gain coefficient 'k' by utilizing Equation (21) given above, on the basis of the friction coefficient μ and the slip ratio λ sent from the acquisition part 310 and of the coefficient 'b' in the storage part 380. And, using Equation (20) given above, the parameter calculation part 390 calculates the time constant τ subsequently on the basis of this gain coefficient 'k' and of the coefficient 'a' in the storage part 380.

And the parameter calculation part 390 sends this gain coefficient 'k' that has been calculated to the gain multiplication part 370, and also sends the time constant τ that has been calculated to the filter part 360. As a result, along with the gain coefficient 'k' that has been calculated being set to the gain multiplication part 370, also the time constant that has been calculated is set to the filter part 360. When these settings are performed, the torque command value calculation part 320, the estimated torque value calculation part 330, the inverse torque value calculation part 340, the subtraction part 350, the filter part 360, and the gain multiplication part 370 cooperate together to execute model following control according to these settings while taking the torque instruction value $T^*_m$ and the rotational speed ω as inputs.

Subsequently, repetition is performed of new calculation and new setting of the gain coefficient 'k' and of the time constant τ, and of model following control with these new settings while taking the above torque instruction value $T^*_m$ and the rotational speed ω as inputs. Traction control is performed by this repetition.

As has been explained above, in this embodiment, the acquisition part 310 acquires the torque instruction value $T^*_m$, for the driving wheel WH, the rotational speed ω of the driving wheel WH, the estimated friction coefficient μ for the surface of the road upon which the driving wheel WH is traveling, and the slip ratio λ of the driving wheel WH. And the parameter calculation part 390 calculates the adaptive gain coefficient 'k' for the state of the surface of the road upon which the vehicle is traveling, on the basis of the friction coefficient μ and the slip ratio λ sent from the acquisition part 310 and the coefficient 'b' in the storage part 380. Subsequently, on the basis of the above gain coefficient 'k' and the coefficient 'a' in the storage part 380, the parameter calculation part 390 calculates the adaptive time constant τ that is suitable for ensuring the stability of traction control. And, along with this gain coefficient 'k' that has been calculated being set to the gain multiplication part 370, also the above time constant τ that has been calculated is set to the filter part 360. When these settings have been made, model following control that takes, as its reference model, an adhesion model in which slip of the driving wheel WH does not occur is executed according to these settings.

During this model following control, the torque command value calculation part 320 calculates the torque command value $T_m$ to be outputted to the motor 960 that drives the driving wheel WH on the basis of the torque instruction value $T^*_m$ and the correction amount $T_b$. Next, the estimated torque value calculation part 330 performs torque value estimation by calculating the estimated torque value $T_e$ acting upon the driving wheel WH on the basis of the torque command value $T_m$ that has been calculated and the torque transfer model to the driving wheel WH. And, in parallel with this calculation of the estimated torque value $T_e$, the inverse torque value calculation part 340 calculates the inverse torque value $T_n$ corresponding to the rotational speed ω, according to the adhesion model in which no slip occurs.

Next, the subtraction part 350 calculates the differential torque value $T_h$ for which the estimated torque value $T_e$ has been subtracted from the inverse torque value $T_n$. And the filter part 360 subsequently calculates the torque value $T_f$ after filtering, for which a first-order delay with the time constant τ has been applied to the differential torque value $T_h$. Then the gain multiplication part 370 calculates the correction amount $T_b$ by multiplying the torque value after filtering $T_f$ by the gain coefficient 'k', and feeds this correction amount $T_b$ that has thus been calculated back to the torque command value calculation part 320.

Thus, according to this embodiment, along with it being possible to enhance the performance for suppression of slip while maintaining the control stability, it is also possible to perform traction control that, according to the state of the road surface, can implement stable traveling while still ensuring the required drive force.

Modification of Embodiments

The present invention is not to be considered as being limited to the embodiment described above; changes of various types may be incorporated therein.

For example, in the embodiment described above, the friction coefficient estimation part 930 and the slip ratio estimation part 940 were externally arranged to the traction control device 300. By contrast, it would also be acceptable to arrange for the traction control device to include the friction coefficient estimation part and the slip ratio estimation part.

Furthermore, in the explanation of the embodiment described above, it was arranged for the friction coefficient estimation part 930 to estimate the normal force N acting upon the driving wheel WH on the basis of the result detected by a load sensor. By contrast, if the weight M of the moving body MV and the position of its barycenter are already known, it would also be acceptable to arrange to estimate the normal force N not by using any load sensor, but rather by appropriately employing the results of detection by an acceleration sensor, by an angular velocity sensor, and by a gyro sensor mounted to the moving body MV.

Moreover, in the explanation of the embodiment described above, an example was shown of a technique for, during estimation of the speed v by the slip ratio estimation part 940, integrating with respect to time the result of detection by the acceleration sensor. By contrast, for example, it would also be acceptable to arrange to estimate the speed v by photographing a region of the road surface that is in a predetermined positional relationship with the moving body MV, and by analyzing the change over time of the result of this photography.

Furthermore, in the embodiment described above, according to Equation (21) given above, the calculation of the gain coefficient 'k' was performed on the basis of the ratio between the slip ratio λ and the friction coefficient μ. By contrast, it would also be acceptable to arrange for the gain coefficient to be calculated on the basis of the following Equation (22), where the value of the constant 'c' is zero or greater:

$$k = b \cdot (\lambda/\mu) + c \qquad (22)$$

By adding the constant 'c' as in this Equation (22), it is possible to add an amount of a constant magnitude to the gain coefficient 'k' that is adaptively calculated. Thereby, it is possible to soften changes of the gain coefficient when the slip ratio λ or the friction coefficient μ is close to zero, so that there is the beneficial effect of preventing excessive reaction to changes of the state of the road surface. An appropriate value for this constant 'c' may be determined in advance by experiment or by simulation. Note that Equation (21) represents the case when, in Equation (22), the value of the constant 'c' is zero.

Moreover, in the embodiment described above, the gain coefficient 'k' was calculated on the basis of the ratio between the slip ratio λ and the friction coefficient μ. By contrast, it would also be acceptable to arrange for the gain coefficient 'k' to be calculated according to the following Equation (23) on the basis of a coefficient 'd' and the friction coefficient μ, without any reference to the slip ratio λ:

$$k = d/\mu \qquad (23)$$

Since the slip ratio influences the gain, this can also be considered as adaptation already having been made to the slip ratio, in Equation (18) given above. Due to this, even though according to Equation (23) the gain coefficient 'k' is calculated by only utilizing the friction coefficient μ that does not appear in Equation (18), still the gain in Equation (18) is set to a value that is adapted both to the slip ratio λ and to the friction coefficient μ. Since, in this case, there is no necessity to estimate the slip ratio in real time during traction control, accordingly it is possible to omit the sensor for detecting the speed v, and also to omit the resources for calculating the speed on the basis of the result of detection by that sensor. Note that an appropriate value for the coefficient 'd' may be determined by simulation or by experiment.

Furthermore, it would also be acceptable to calculate the gain coefficient 'k' using a coefficient 'e', according to the following Equation (24):

$$k = d/\mu + e \cdot \lambda \qquad (24)$$

While the slip ratio λ can be calculated, if the accuracy of the slip ratio that is calculated is low, by reducing the value of the coefficient 'e', it is possible relatively lower the degree of adaptation to the slip ratio λ. An appropriate value for this coefficient 'e' may be determined in advance by experiment or by simulation. Note that Equation (23) represents the case when, in Equation (24), the value of the efficient 'e' is zero.

Moreover, in the embodiment described above, the value of the coefficient 'b' depended upon the slip ratio λ and the friction coefficient μ. By contrast, it would also be acceptable to arrange to construct a table for determining the gain coefficient 'k' according to the slip ratio λ and the friction coefficient μ. In this case, it would also be possible to determine the gain coefficient 'k' by performing weighting or the like with the slip ratio λ and the friction coefficient μ, so that, in stable regions and unstable regions like those of FIGS. 3 and 4, it would be possible to change the amount of adaptation according to the state of the road surface in a simple and easy manner.

Note that an example of the contents of a table for determining the gain coefficient 'k' according to the slip ratio λ and the friction coefficient μ is shown in FIG. 12. Here, in FIG. 12(A), an example is shown in which, the more the slip ratio λ increases, the greater is the rate of increase of the gain coefficient 'k'. Moreover, in FIG. 12(B), an example is shown in which, at the boundary between the stable region and the unstable region in FIGS. 3 and 4, the rate of increase of the gain coefficient 'k' increases along with increase of the slip ratio λ.

Moreover, if the only objective is to ensure the stability, then, instead of employing Equation (20), it would be possible to set the time constant τ so as to satisfy the following Equation (25):

$$\tau \geq a \cdot k \qquad (25)$$

While the control band becomes narrow if the time constant τ satisfies the condition of this Equation (25), on the other hand the stability becomes higher, since both the gain margin and the phase margin become large. Accordingly, on the assumption that the road surface is frozen and is in a slippery state, it is also possible to estimate the maximum value of the gain coefficient 'k' from Equations (21) through (24) that are used for obtaining the value of the gain coefficient 'k', or from a table like that shown in FIG. 12, and to set a time constant τ that is calculated by multiplying this maximum value by the coefficient 'a' as a fixed value. If the value of the gain coefficient 'k' obtained adaptively during traveling is small, then, since the time constant τ calculated from the maximum value of the gain coefficient 'k' is used, accordingly the control band becomes narrow, although there is no problem with stability. However since, when the value of the gain coefficient is small, the state upon a dry road surface is one of very little slip, accordingly no particular problem arises, even though the control band for suppression of slip is low. In other words, it is also possible to set to a fixed value the value of the time constant τ that is calculated by estimating the maximum value that the adaptively generated gain coefficient 'k' can assume.

EXAMPLES

Next, an example of the present invention will be explained with principal reference to FIGS. 13 through 17. Note that, in the following explanation, the same reference symbols will be appended to elements that are the same as or equivalent to elements included in the embodiment described above, and duplicated explanation will, as much as possible, be omitted.

[Configuration]

Figure 13:
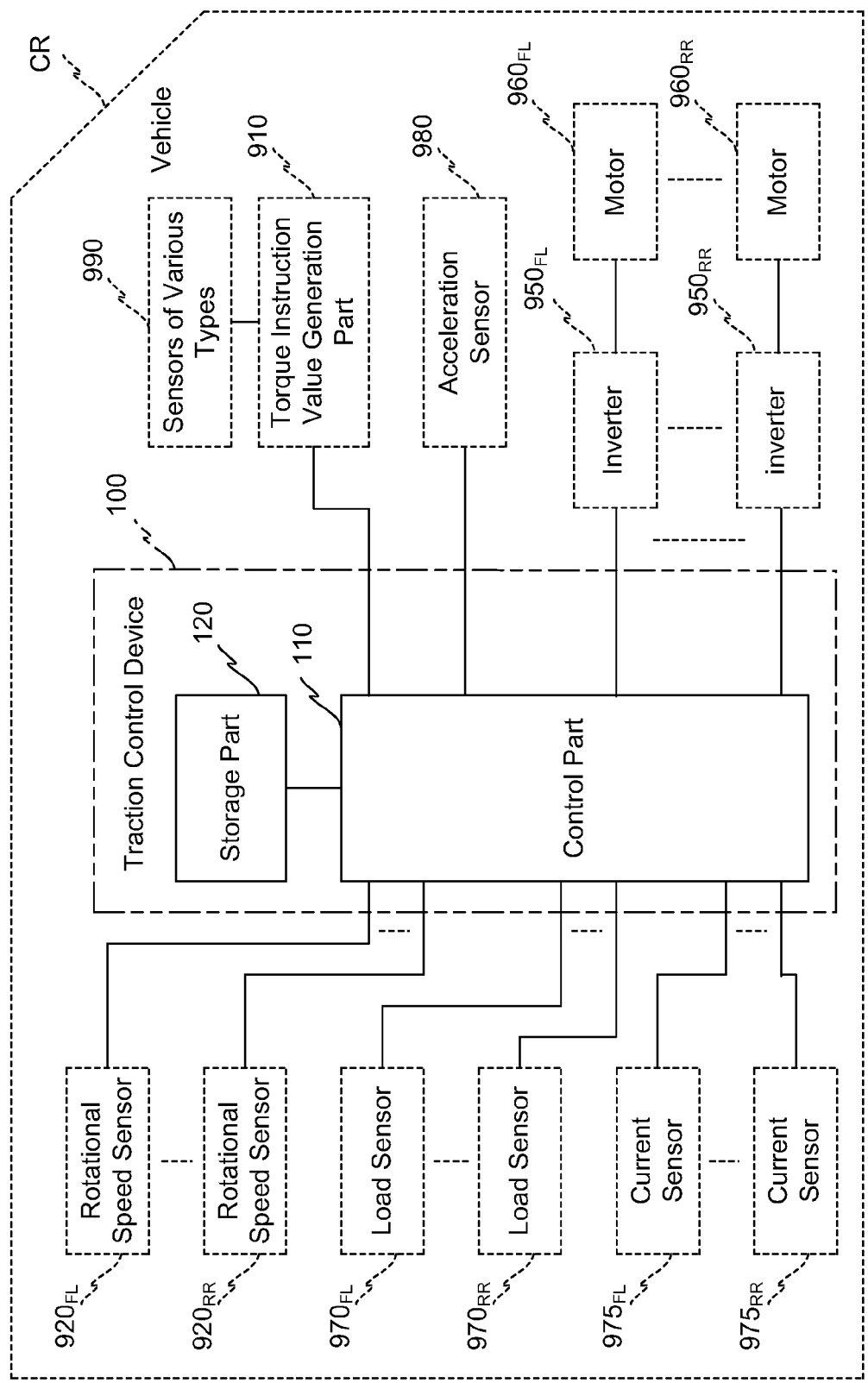
FIG. 13 is the block diagram schematically showing the configuration of a traction control device of the example of the present invention.

The configuration of a traction control device 100 according to an example is schematically shown in FIG. 13. As shown in this FIG. 13, the traction control device 100 is arranged within a vehicle CR, which serves as a moving body MV. Note that the vehicle CR has four driving wheels: a left side front driving wheel $WH_{FL}$, a right side front driving wheel $WH_{FR}$, a left side rear driving wheel $WH_{RL}$, and a right side rear driving wheel $WH_{RR}$.

A torque instruction value generation part 910, rotational speed sensors $920_j$ (j=FL, FR, RL, RR), inverters $950_j$, motors $960_j$, load sensors $970_j$, current sensors $975_j$, an acceleration sensor 980, and sensors 990 of various types are mounted to the vehicle CR. Here, the rotational speed sensors $920_j$, the inverters $950_j$, the motors $960_j$, the load sensors $970_j$, and the current sensors $975_j$ are installed to correspond to the driving wheels $WH_j$.

The torque instruction value generation part 910 generates torque instruction values $T^*_{m,j}$ corresponding to each of the driving wheels $WH_j$ on the basis of the results of detection by an accelerator opening amount sensor, a braking amount sensor, an angular velocity sensor, and so on that are included in the sensors 990 of various types. The torque instruction values $T^*_{m,j}$ that are generated in this manner are sent to the traction control device 100.

Each of the rotational speed sensors $920_j$ described above detects the rotational speed $\omega_j$ of the corresponding driving wheel $WH_j$. The rotational speeds $\omega_j$ that have been detected in this manner are sent to the traction control device 100.

Each of the inverters $950_j$ described above receives a torque generation signal corresponding to its torque command value $T_{m,j}$ sent from the traction control device 100. And each of the inverters $950_j$ generates a motor drive signal according to that corresponding torque generation signal, and sends this motor drive signal that it has generated to its corresponding motor $960_j$.

Each of the motors $960_j$ described above receives the motor drive signal sent from the corresponding one of the inverters. And each of the motors $960_j$ performs motor rotational motion on the basis of that motor drive signal, and thereby causes its driving wheel $WH_j$ to rotate.

Each of the load sensors $970_j$ described above detects the load acting upon the corresponding driving wheel $WH_j$, in other words the corresponding normal force $N_j$. The normal forces $N_j$ detected in this manner are sent to the traction control device 100.

Each of the current sensors $975_j$ described above detects the current $I_j$ flowing to the motor that drives the corresponding driving wheel $WH_j$. The currents $I_j$ detected in this manner are sent to the traction control device 100.

The acceleration sensor 980 described above detects the acceleration α of the vehicle CR. The acceleration α that has been detected in this manner is sent to the traction control device 100.

Next, the configuration of this traction control device 100 will be explained. As shown in FIG. 13, the traction control device 100 comprises a control unit 110 and a storage unit 120. And the torque instruction value generation part 910, the rotational speed sensors $920_j$, the load sensors $970_j$, the current sensors $975_j$, and the acceleration sensor 980 are connected to the control unit 110.

The control unit 110 comprises a central processing device (CPU) and a DSP (Digital Signal Processor). By executing a program, this control unit 110 performs the functions in the embodiment described above of the acquisition part 310, the torque command value calculation part 320, the estimated torque value calculation part 330, the inverse torque value calculation part 340, the subtraction part 350, the filter part 360, the gain multiplication part 370, the parameter calculation part 390, and the friction coefficient estimation part 930 and slip ratio estimation part 940.

The program executed by the control unit 110 is stored in the storage unit 120, and is loaded from the storage unit 120 and executed. It would be acceptable to arrange for this program to be acquired in the format of being recorded upon a transportable recording medium such as a CD-ROM, a DVD, or the like; or, alternatively, it would also be acceptable to arrange for this program to be acquired in the format of being distributed via a network such as the internet or the like.

Note that the processing performed by the control unit 110 will be described hereinafter.

The storage unit 120 stores information and data of various kinds used by the control unit 110, such as the program described above and so on. This information and data includes dead times $L_j$ corresponding to the driven wheels $WH_j$, the time constants $\tau_{1,j}$ of the torque responses of the motors $960_j$ corresponding to the driving wheels $WH_j$, the moments of inertia $J_{W,j}$ of the driving wheels $WH_j$, the distributed masses $M_j$ to the driving wheels $WH_j$, the radiuses $r_j$ of the driving wheels $WH_j$, and coefficients $a_j$ and $b_j$ corresponding to the driving wheels $WH_j$. It is arranged for the control unit 110 to be able to access this storage unit 120.

In this example, the distributed masses $M_j$ is ascertained on the basis of the results of detection by each of the corresponding load sensors $970_j$ when the vehicle CR is stopped in a horizontal state, and it is arranged for this distributed masses $M_j$ that has thus been ascertained to be stored in the storage unit 120. Moreover, it is arranged for the dead times $L_j$ corresponding to the driven wheels $WH_j$, the time constants $\tau_{1,j}$ of the torque responses of the motors $960_j$ corresponding to the driving wheels $WH_j$, the moments of inertia $J_{W,j}$ of the driving wheels $WH_j$, and the radiuses $r_j$ of the driving wheels $WH_j$ and the coefficients $a_j$ and $b_j$ to be obtained on the basis of the previously known specification of the vehicle CR, and to be stored in the storage unit 120.

Note that if any of the dead times $L_j$ corresponding to the driven wheels $WH_j$, the time constants $\tau_{1,j}$ of the torque responses of the motors $960_j$ corresponding to the driving wheels $WH_j$, the moments of inertia $J_{W,j}$ of the driving wheels $WH_j$, and the radiuses $r_j$ of the driving wheels $WH_j$ cannot be obtained on the basis of the previously known specification of the vehicle CR, then it would be acceptable to arrange for that parameter to be obtained by actual measurement.

[Operation]

Next, the operation for traction control performed by the traction control device 100 having a configuration like that described above will be explained, with attention being principally directed to the processing by the control unit 110.

Note that it will be supposed that the torque instruction values $T^*_{m,j}$ that have been generated are sequentially sent from the torque instruction value generation part 910 to the traction control device 100. Moreover, it will be supposed that the rotational speeds $\omega_j$ that have been detected are sequentially sent from the rotational speed sensors $920_j$ to the traction control device 100. Furthermore, it will be supposed that the normal forces $N_j$ that have been detected are sequentially sent from the load sensors $970_j$ to the traction control device 100. Even further, it will be supposed that the current values $I_j$ that have been detected are sequentially sent from the current sensors $975_j$ to the traction control device 100. And it will be supposed that the acceleration $\alpha$ that has been detected is sequentially sent from the acceleration sensor 980 to the traction control device 100.

Moreover, it will be supposed that the dead times $L_j$ corresponding to the driven wheels $WH_j$, the time constants $\tau_{1,j}$ of the torque responses of the motors $960_j$ corresponding to the driving wheels $WH_j$, the moments of inertia $J_{W,j}$ of the driving wheels $WH_j$, the distributed masses $M_j$ to the driving wheels $WH_j$, and the radiuses $r_j$ of the driving wheels $WH_j$ and their coefficients $a_j$ and $b_j$ are already stored in the storage unit 120.

Figure 14:
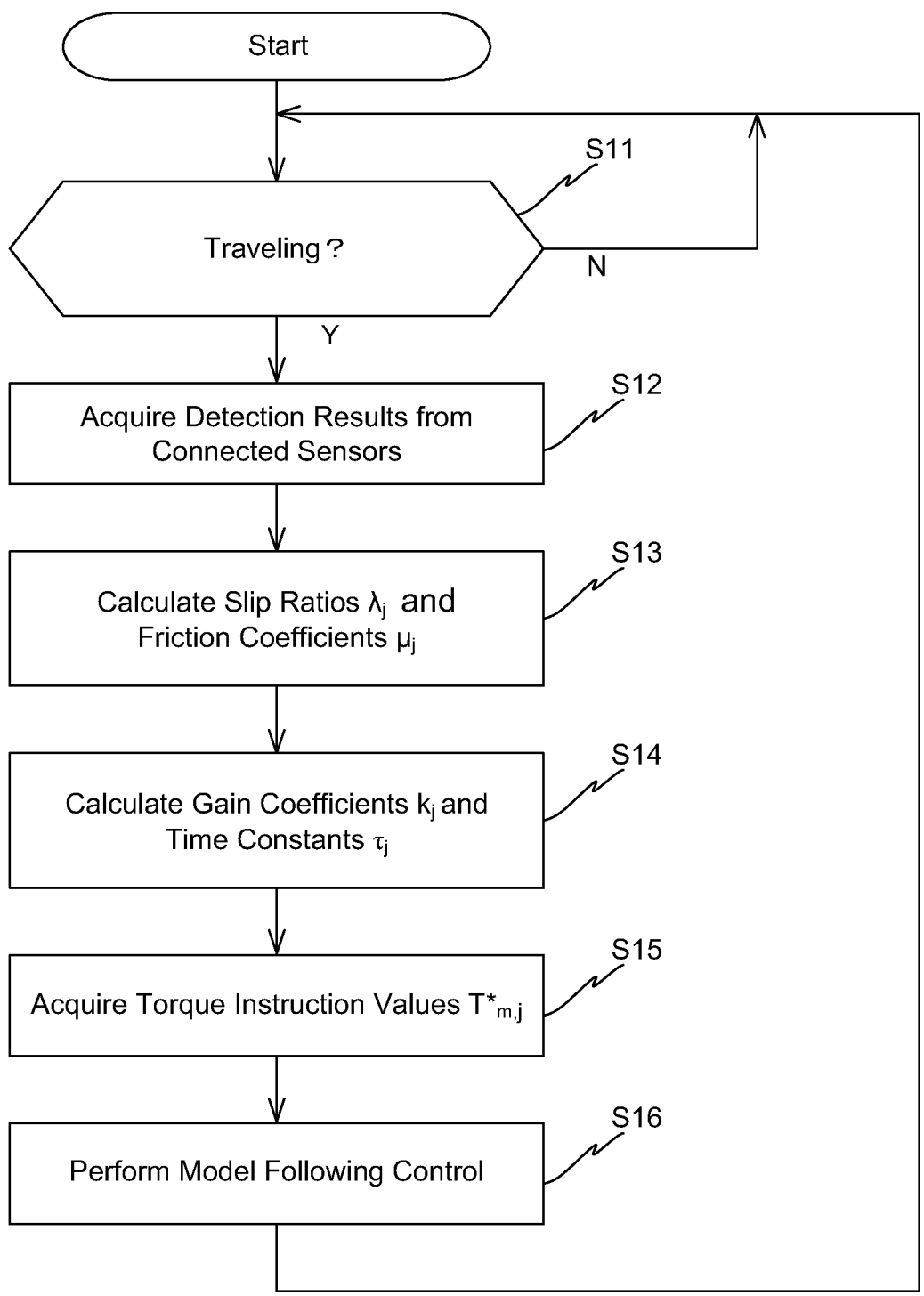
FIG. 14 is a flow chart for explaining the traction control processing with the device of FIG. 13.

During the processing for traction control, as shown in FIG. 14, first in step S11 the control unit 110 makes a decision as to whether or not the vehicle CR is traveling. This decision may be performed by making a decision as to whether or not the rotational speeds $\omega_j$ of all of the driving wheels $WH_j$ are "0", or by making a decision as to whether or not the integrated value with respect to time of the acceleration $\alpha$ is "0". If the result of the decision in this step S11 is negative (S11: N), then the processing of this step S11 is repeated.

But if the result of the decision in this step S11 is affirmative (S11: Y), then the flow of control proceeds to step S12. In this step S12, the control unit 110 acquires the rotational speeds $\omega_j$, the normal forces $N_j$, the current values $I_j$, and the acceleration $\alpha$ at this time point.

Next in step S13 the control unit 110 estimates the friction coefficients $\mu_j$ and the slip ratios $\lambda_j$. During this estimation of the friction coefficients $\mu_j$, first, according to the drive force observer function described above, the control unit 110 estimates the drive forces $F_{d,j}$ upon the driving wheels on the basis of their rotational speeds $\omega_j$ and the actual torque values $T_{r,j}$ calculated from the current values $I_j$. And, on the basis of the drive forces $F_{d,j}$ and the normal forces $N_j$, the control unit 110 estimates the friction coefficients $\mu_j$ by using Equation (10) given above.

Moreover, when estimating the slip ratios $\lambda_j$, first, the control unit 110 estimates the speed v of the vehicle CR by performing integration with respect to time of the acceleration $\alpha$. And, on the basis of the estimated speed v and the rotational speeds $\omega_j$, the control unit 110 estimates the slip ratios $\lambda_j$ by using Equation (11) given above.

Next, in step S14, the control unit 110 calculates the gain coefficients $k_j$ and the time constants $\tau_j$ on the basis of the friction coefficients $\mu_j$ and the slip ratios $\lambda_j$ that have been estimated, and on the basis of the coefficients $a_j$ and $b_j$ in the storage unit 120. During this calculation of the gain coefficients $k_j$ and the time constants $\tau_j$, first, on the basis of the friction coefficients $\mu_j$, the slip ratios $\lambda_j$ and the coefficients $b_j$, the control unit 110 calculates the gain coefficients $k_j$ using Equation (21) given above. And, using Equation (20) given above, the control unit 110 calculates the time constants $\tau_j$ on the basis of the gain coefficients $k_j$ that have been calculated and the coefficients $a_j$.

Next in step S15 the control unit 110 acquires the torque instruction values $T^*_{m,j}$ at this time point. And in step S16 the control unit 110 performs processing for model following control.

During this processing for model following control, on the basis of the torque instruction values $T^*_{m,j}$ that have been acquired and the correction amounts $T_{b,j}$ at this time point, the control unit 110 calculates torque command values $T_{m,j}$ by using Equation (2) given above, and sends torque generation signals corresponding to the torque command values $T_{m,j}$ that have thus been calculated to the inverters $950_j$. As a result, the inverters $950_j$ generate motor drive signals according to these torque generation signals, and send these motor drive signals that have thus been generated to the motors $960_j$. And the motors $960_j$ perform rotational motion on the basis of these motor drive signals, and thereby cause the driving wheels $WH_j$ to rotate.

Having calculated the torque command values $T_{m,j}$ as described above, the control unit 110 performs torque value estimation by calculating estimated torque values $T_{e,j}$ using Equation (3) given above on the basis of these torque command values $T_{m,j}$. Almost simultaneously with this calculation of the estimated torque values $T_{e,j}$, the control unit 110 calculates inverse torque values $T_{n,j}$ corresponding to the rotational speeds $\omega_j$ according to an adhesion model in which no slip takes place, using Equation (4) given above.

Next, using Equation (5) given above, the control unit 110 calculates the differential torque values $T_{h,j}$ by subtracting the estimated torque values $T_{e,j}$ from the inverse torque values $T_{n,j}$. And, subsequently, the control unit 110 calculates the torque values after filtering $T_{f,j}$ by applying a first-order delay with time constant $\tau$ using Equation (6) given above. Then the control unit calculates the correction amounts $T_{b,j}$ by multiplying the torque values after filtering $T_{f,j}$ by the gain coefficients $k_j$.

When the new correction amounts $T_{b,j}$ have been calculated in this manner, the processing of step S16 terminates, and the flow of control returns to step S11. And subsequently traction control for the driving wheels $WH_j$ is performed by the processing of steps S11 through S16 being repeated.

Examples of simulation results for traction control by the traction control device 100 performed as described above are shown in FIG. 15. Note that, in FIG. 15, cases in which the gain coefficients $k_j$ and the time constants $\tau_j$ are fixed are shown.

As will be understood from these simulation results, by comparison with the case in which the gain coefficients $k_j$ and the time constants $\tau_j$ are fixed, when the gain coefficients $k_j$ and the time constants $\tau_j$ are generated in an adaptive manner according to the state of the road surface as in this example; it is possible to obtain compatible performance for suppression of slip upon a frozen road surface and for prevention of unnecessary reduction of torque upon a dry road surface. Moreover, unstable operation to the extent that can become a problem due to change of the state of the road surface does not occur. In other words the fact has been confirmed by simulation that adaptive generation of the gain coefficients $k_j$ and of the time constants $\tau_j$ according to the state of the road surface can be said to be effective, from the standpoints of compatibility of slip suppression performance and also of prevention of unnecessary decrease of torque.

Figure 16:
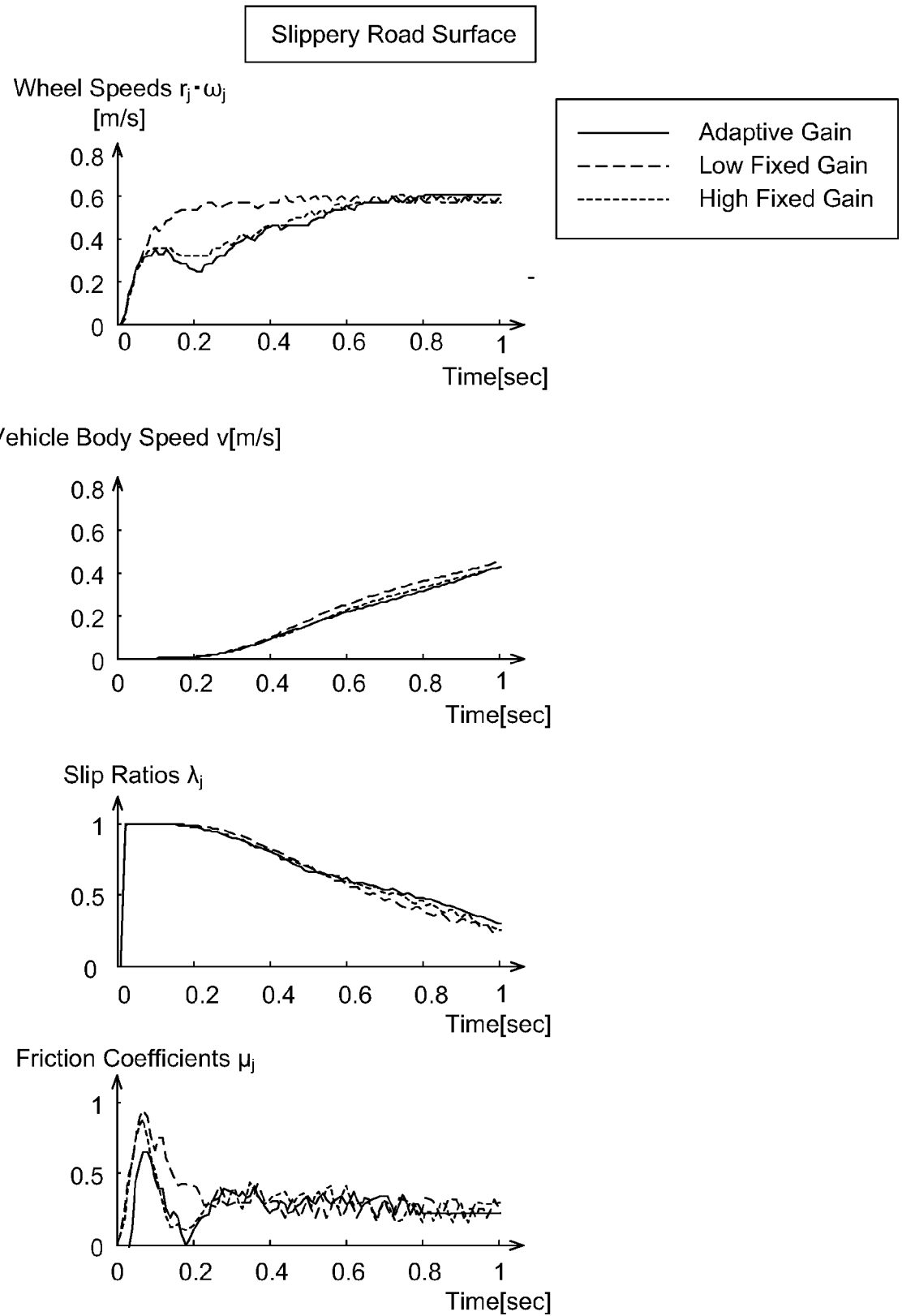
FIG. 16 is the first figure showing experimental results for a model of the device of FIG. 13.

Moreover, using a vehicle of compact type, experiments were performed for a case in which the gain coefficients $k_j$ and the time constants $\tau_j$ were fixed, and for a case in which the gain coefficients $k_j$ and the time constants $\tau_j$ were generated adaptively according to the state of the road surface, as in this example. The results of these experiments are shown in FIG. 16 and FIG. 17. Here, in FIG. 16, experimental examples are shown for the case in which the road surface is slippery. Moreover, in FIG. 17, experimental examples are shown for the case in which the road surface is not slippery.

While, in the case shown in FIG. 16 in which the road surface was slippery, increase of the wheel rotational speed was suppressed with a low fixed gain during the interval of 0.1 to 0.6 [sec] directly after starting off from rest, in the case in which the gain coefficients $k_j$ and the time constants $\tau_j$ were generated in an adaptive manner as in this example, increase of the wheel rotational speed was suppressed in a similar manner to the case of high fixed gain. Note that while, in FIG. 16 described above, it is difficult to see the differences in the slip ratios $\lambda_j$ between the three types of case for which experiments were performed, since the vehicle body speed was low, nevertheless, in each of these cases, it is seen that a beneficial effect for suppression of slip was obtained.

On the other hand, in the case shown in FIG. 17 in which the road surface was not slippery, with a high fixed gain, increase of the wheel rotational speed was suppressed during the interval of 0.1 to 0.5 [sec] directly after starting off from rest. And, during the interval of 0.3 to 0.8 [sec] directly after starting off from rest, the increase in the vehicle body speed was small. In other words it may be said that, with a high fixed gain, unnecessary suppression of the wheel rotation speed was taking place. However, when the gain coefficients $k_j$ and the time constants $\tau_j$ were generated in an adaptive manner as in this example, sufficient acceleration was obtained in a similar manner to the case of a low fixed gain, since the wheel rotational speed was not suppressed unnecessarily.

Figure 15:
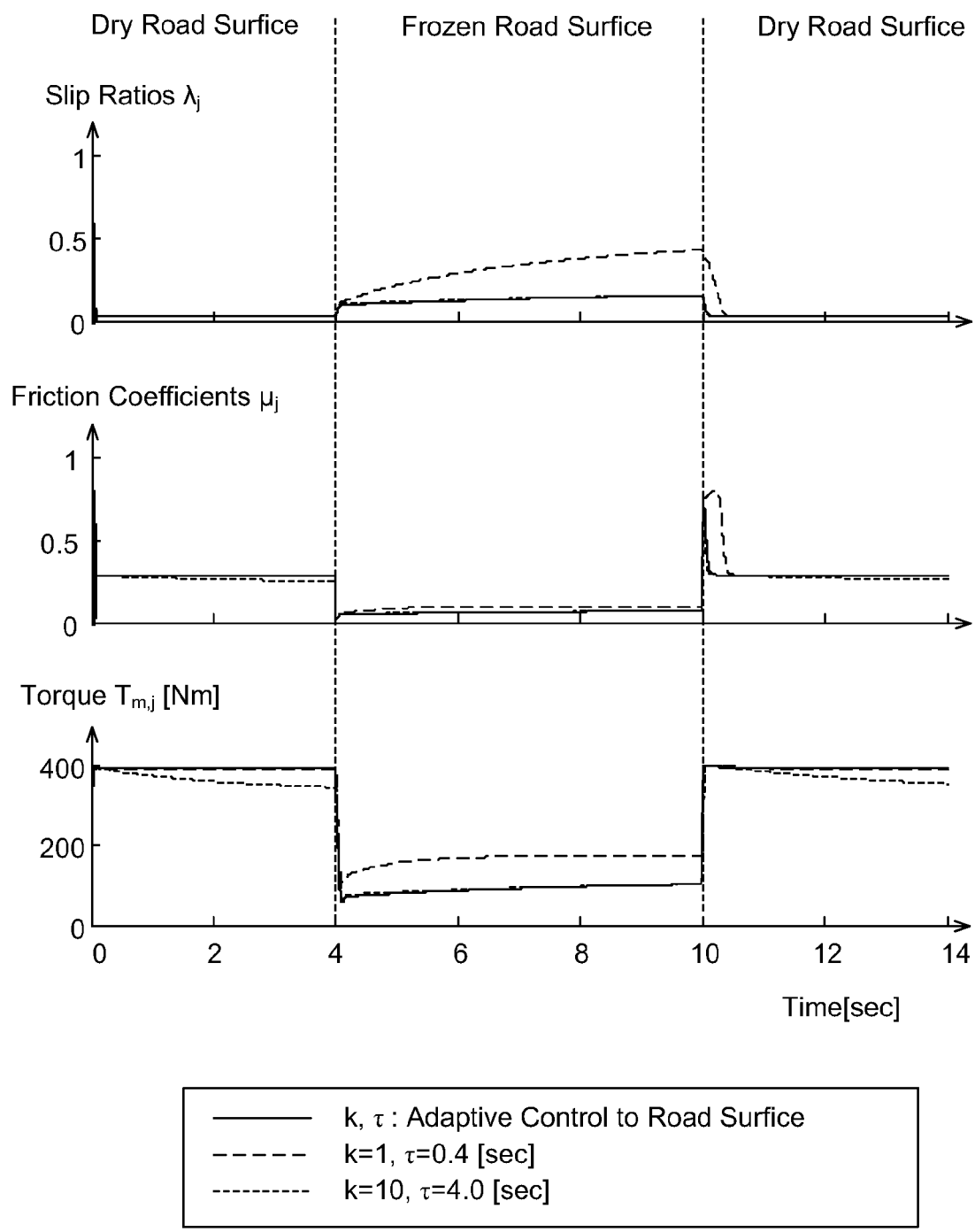
FIG. 15 is the figure showing simulation results for the traction control by the device of FIG. 13.

As a result, in a similar manner to the case for the simulation results shown in FIG. 15, by generating the gain coefficients $k_j$ and the time constants $\tau_j$ in an adaptive manner as in this example, it was confirmed that satisfactory results were obtained in terms of enhancement of the performance for suppression of slip in conditions of easy slip, and in terms of the absence of unnecessary reduction of torque in conditions in which slip could not occur easily.

As has been explained above, in this example, the control unit 110 calculates the adaptive gain coefficients $k_j$ according to the state of the road surface over which the vehicle is traveling on the basis of the coefficients $b_j$, for which appropriate values are determined according to the friction coefficients $\mu_j$ and the slip ratios $\lambda_j$ for the road surfaces over which the driving wheels $WH_j$ are passing, the moments of inertia $J_{W,j}$ of the driving wheels $WH_j$, the distributed masses $M_j$ to the driving wheels $WH_j$, and the radiuses $r_j$ of the driving wheels $WH_j$. The control unit 110 subsequently calculates adaptive time constants $\tau_j$ that are capable of ensuring stability of the traction control, on the basis of the coefficients $a_j$ that are determined according to the moments of inertia $J_{W,j}$ of the driving wheels $WH_j$ of the vehicle CR, the distributed masses $M_j$ to the driving wheels $WH_j$, the radiuses $r_j$ of the driving wheels $WH_j$, the dead times $L_j$, and the time constants $\tau_{1,j}$ of the torque responses of the motors $960_j$, and on the basis of the gain coefficients $k_j$. And, in a state in which these gain coefficients $k_j$ that have thus been calculated have been set and also these time constants $\tau_j$ that have thus been calculated have been set, model following control is performed by taking, as the reference model, an adhesion model in which slip of the driving wheels $WH_j$ does not take place.

Thus, according to this example, along with it being possible to enhance the performance for suppression of slip while maintaining the control stability, it is also possible to perform traction control that, according to the state of the road surface, can implement stable traveling while still ensuring the required drive force.

Modification of the Example

The present invention is not to be considered as being limited to the example described above; changes of various sorts can be made therein.

For example, with the example described above, the present invention was applied to a moving body that was a vehicle CR having four driving wheels that could be driven independently. By contrast, it would also be acceptable to apply the present invention for performing traction control in the case of a moving body having one or more driving wheels. Note that, if the moving body has a plurality of driving wheels, then it is possible to apply the present invention for performing traction control, irrespective of whether or not each of the driving wheels can be driven independently.

Moreover, for the example described above, it is also possible to implement appropriate variations that are similar to those for the embodiment described above.

That is to say, in the example described above, it is arranged to estimate the normal force N operating upon the driving wheel on the basis of the result of detection by a load sensor. By contrast, if the weight M of the vehicle and the position of its barycenter are already known, it would also be acceptable to arrange not to employ any load sensor, but to estimate the normal force N while appropriately employing the results of detection from an acceleration sensor, from an angular velocity sensor, and from a gyro sensor that are mounted to the vehicle.

Moreover, in the example described above, it was arranged to estimate the vehicle speed v by integrating with respect to time the result of detection by the acceleration sensor. By contrast it would also be acceptable, for example, to arrange to estimate the vehicle speed v by photographing a region upon the road surface that is in a predetermined positional relationship with the vehicle, and by analyzing changes of the result of this photography over time. Moreover, since the slip ratio of a non-driving wheel is almost zero except during braking, accordingly it would also be possible to arrange to estimate the vehicle speed v by detecting the rotational speed of a non-driving wheel.

Furthermore, in the example described above, it was arranged to calculate the gain coefficients $k_j$ on the basis of the ratios between the slip ratios $\lambda_j$ and the friction coefficients $\mu_j$, using Equation (21) given above. By contrast, it would also be acceptable to arrange to calculate the gain coefficients $k_j$ according to Equations (22) through (24) given above.

Yet further, in the example described above, the coefficients $b_j$ had values that depended upon the slip ratios $\lambda_j$ and upon the friction coefficients $\mu_j$. By contrast, it would also be acceptable to arrange to create a table for determination of the gain coefficients $k_j$ according to the slip ratios $\lambda_j$ and the friction coefficients $\mu_j$.

Furthermore, while each of the current sensors $975_j$ in FIG. 13 detects the current $I_j$ that flows to the corresponding motor $960_j$, since this detected current $I_j$ is the current for actually driving the motor, accordingly it is possible to obtain the actual torque values $T_{r,j}$ by multiplying these current values by torque constants $K_{t,j}$. Since, as will be understood from FIG. 1 given above and from the description corresponding to FIG. 1, these actual torque values $T_{r,j}$ are equal to the estimated torque values $T_{e,j}$, accordingly it would also be acceptable to arrange to perform the torque value estimation by calculating the estimated torque values $T_{e,j}$ from the equation $T_{e,j}=K_{t,j}\cdot I_j$, instead of from Equation (3).

Moreover, when the estimated torque values $T_{e,j}$ obtained by the method described above and the signals for the torque command values $T_{m,j}$ are compared upon the time axis, then it becomes possible to calculate the dead time L according to the delay from the torque command values $T_{m,j}$ to the estimated torque values $T_{e,j}$. Moreover, it also becomes possible to calculate the torque response time constants $\tau_{1,j}$ according to the rise characteristics of the estimated torque values $T_{e,j}$ when the torque command values $T_{m,j}$ are supplied stepwise.

Furthermore, as mentioned in connection with the embodiment described above, if the objective is only to ensure stability, then it will be sufficient to set the time constants $\tau_j$ so as to satisfy Equation (25) above.

The invention claimed is:

1. A traction control device that performs traction control for a moving body having a driving wheel which is driven by a motor, comprising:
    an acquisition part configured to acquire a torque instruction value for said driving wheel, the rotational speed of said driving wheel, and friction coefficient information for the road surface upon which said driving wheel runs;
    a torque command value calculation part configured to calculate the torque command value to be outputted to the motor for driving said driving wheel, on the basis of said acquired torque instruction value and a correction amount;
    an estimated torque value calculation part configured to calculate an estimated value of torque operating upon said driving wheel, on the basis of said calculated torque command value and a model for torque transmission to said driving wheel;
    an inverse torque value calculation part configured to calculate a torque value corresponding to said acquired rotational speed, according to a reference model in which no slip of said driving wheel takes place;
    a filter part configured to apply a first-order delay to the difference between the result of calculation by said estimated torque value calculation part and the result of calculation by said inverse torque value calculation part; and
    a gain multiplication part configured to feed back, to said torque command value calculation part, as said correction amount, the result obtained by multiplying said difference to which said first-order delay has been applied by a gain coefficient; wherein
    said gain coefficient takes a value which is adaptively set by using said acquired friction coefficient information; and
    the time constant of said filter part takes a value which is adaptively set by utilizing said acquired friction coefficient information, or a value which is determined on the basis of the estimated value of the maximum value taken by said gain coefficient.

2. A traction control device according to claim 1, wherein a dead time and a motor torque response time are included in said torque transfer model; and
    said traction control device further comprises a time constant setting part configured to set said time constant to a value that, while corresponding to said gain coefficient, is effective for ensuring width of the control band, depending on said dead time, said motor torque response time period, the weight of said moving body, and the moment of inertia and the radius of said driving wheel.

3. A traction control device according to claim 2, wherein said time constant setting part calculates said time constant $\tau$ from said gain coefficient 'k' according to Equation (I) below, on the basis of a constant 'a' that is determined in advance to correspond to said dead time, said motor torque response time period, the weight of said moving body, and the moment of inertia and the radius of said driving wheel $$\tau \geq a \cdot k \qquad (I).$$

4. A traction control device according to claim 3, further comprising a gain coefficient setting part configured to set said gain coefficient by utilizing said acquired friction coefficient information, according to the weight of said moving body and the moment of inertia and the radius of said driving wheel.

5. A traction control device according to claim 2, further comprising a gain coefficient setting part configured to set said gain coefficient by utilizing said acquired friction coefficient information, according to the weight of said moving body and the moment of inertia and the radius of said driving wheel.

6. A traction control device according to claim 1, further comprising a gain coefficient setting part configured to set said gain coefficient by utilizing said acquired friction coefficient information, according to the weight of said moving body and the moment of inertia and the radius of said driving wheel.

7. A traction control device according to claim 6, wherein:
    said acquisition part further acquires slip ratio information for said driving wheel; and
    said gain coefficient setting part calculates said gain coefficient 'k' according to Equation (II) below, on the basis of a constant 'd' that is determined in advance to correspond to the weight of said moving body and the moment of inertia and the radius of said driving wheel, a constant 'e' that is determined in advance, a friction coefficient $\mu$ corresponding to said friction coefficient information that has been acquired, and a slip ratio $\lambda$ corresponding to said slip ratio information that has been acquired $$k = d/\mu + e \cdot \lambda \qquad (II).$$

8. A traction control device according to claim 6, wherein
said acquisition part further acquires slip ratio information for said driving wheel; and
said gain coefficient setting part calculates said gain coefficient 'k' according to Equation (III) below, on the basis of a constant 'b' that is determined in advance to correspond to the weight of said moving body and the moment of inertia and the radius of said driving wheel, a constant 'c' that is determined in advance, a friction coefficient μ corresponding to said friction coefficient information that has been acquired, and a slip ratio λ corresponding to said slip ratio information that has been acquired $$k=b\cdot(\lambda/\mu)+c \quad (III).$$

9. A traction control device that performs traction control for a moving body having a driving wheel which is driven by a motor, comprising:
an acquisition part configured to acquire a torque instruction value for said driving wheel, the rotational speed of said driving wheel, friction coefficient information for the road surface upon which said driving wheel runs, and an actual torque value that drives said motor;
a torque command value calculation part configured to calculate the torque command value to be outputted to the motor for driving said driving wheel, on the basis of said acquired torque instruction value and a correction amount;
an inverse torque value calculation part configured to calculate a torque value corresponding to said acquired rotational speed, according to a reference model in which no slip of said driving wheel takes place;
a filter part configured to apply a first-order delay to the difference between said acquired actual torque part and the result of calculation by said inverse torque value calculation part; and
a gain multiplication part configured to feed back to said torque command value calculation part, as said correction amount, the result obtained by multiplying the value to which said first-order delay has been applied by a gain coefficient; and wherein
said gain coefficient takes a value which is adaptively set by using said acquired friction coefficient information; and
the time constant of said filter part takes a value which is adaptively set by utilizing said acquired friction coefficient information, or a value which is determined on the basis of the estimated value of the maximum value taken by said gain coefficient.

10. A traction control method that performs traction control for a moving body having a driving wheel which is driven by a motor, comprising the steps of:
an acquisition step of acquiring a torque instruction value for said driving wheel, the rotational speed of said driving wheel, and friction coefficient information for the road surface upon which said driving wheel runs;
a torque command value calculation step of, on the basis of said acquired torque instruction value and a correction amount at the present time point, calculating a torque command value to be outputted to the motor for driving said driving wheel;
an estimated torque value calculation step of, on the basis of said calculated torque command value and a model for torque transmission to said driving wheel, calculating an estimated value of torque operating upon said driving wheel;
an inverse torque value calculation step of calculating a torque value corresponding to said acquired rotational speed, according to a reference model in which no slip of said driving wheel takes place;
a first-order delay application process of applying a first-order delay to the difference between the result of calculation in said estimated torque value calculation step and the result of calculation in said inverse torque value calculation step with a time constant which has either a value which is adaptively set by utilizing said acquired friction coefficient information, or a value which is determined on the basis of the estimated value of the maximum value taken by said gain coefficient which is adaptively set by utilizing said acquired friction coefficient information; and
a correction amount updating step of taking the result obtained by multiplying said difference to which said first-order delay has been applied by said gain coefficient, as a new correction amount; and wherein
said acquisition step, said torque command value calculation step of taking said new correction amount as the correction amount at said present time point, said estimated torque value calculation step, said inverse torque value calculation step, said first-order delay application step, and said correction amount updating step are repeated.

11. A non-transitory computer readable recording medium, having recorded thereon a traction control program that, when executed, causes a calculation part to execute a traction control method comprising:
an acquisition step of acquiring a torque instruction value for said driving wheel, the rotational speed of said driving wheel, and friction coefficient information for the road surface upon which said driving wheel runs;
a torque command value calculation step of, on the basis of said acquired torque instruction value and a correction amount at the present time point, calculating a torque command value to be outputted to the motor for driving said driving wheel;
an estimated torque value calculation step of, on the basis of said calculated torque command value and a model for torque transmission to said driving wheel, calculating an estimated value of torque operating upon said driving wheel;
an inverse torque value calculation step of calculating a torque value corresponding to said acquired rotational speed, according to a reference model in which no slip of said driving wheel takes place;
a first-order delay application process of applying a first-order delay to the difference between the result of calculation in said estimated torque value calculation step and the result of calculation in said inverse torque value calculation step with a time constant which has either a value which is adaptively set by utilizing said acquired friction coefficient information, or a value which is determined on the basis of the estimated value of the maximum value taken by said gain coefficient which is adaptively set by utilizing said acquired friction coefficient information; and
a correction amount updating step of taking the result obtained by multiplying said difference to which said first-order delay has been applied by said gain coefficient, as a new correction amount; and wherein
said acquisition step, said torque command value calculation step of taking said new correction amount as the correction amount at said present time point, said estimated torque value calculation step, said inverse torque value calculation step, said first-order delay application step, and said correction amount updating step are repeated.

* * * * *